(12) United States Patent
Turek et al.

(10) Patent No.: US 8,894,762 B2
(45) Date of Patent: Nov. 25, 2014

(54) PHASE CHANGE INK COMPRISING A POLYHYDROXYALKANOATE COMPOUND

(71) Applicant: Xerox Corporation, Norwalk, CT (US)

(72) Inventors: Caroline M. Turek, Mississauga (CA);
Guerino G. Sacripante, Oakville (CA);
Daryl W. Vanbesien, Burlington (CA);
Corey L. Tracy, Calgary (CA); C.
Geoffrey Allen, Waterdown (CA)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 13/625,571

(22) Filed: Sep. 24, 2012

(65) Prior Publication Data
US 2014/0083325 A1 Mar. 27, 2014

(51) Int. Cl.
C09D 11/02 (2014.01)
C09D 11/38 (2014.01)
C09D 11/34 (2014.01)

(52) U.S. Cl.
CPC .............. *C09D 11/34* (2013.01); *C09D 11/38* (2013.01)
USPC .................................... 106/31.29; 106/31.61

(58) Field of Classification Search
CPC ........................................................ C09D 11/34
USPC ............................................ 106/31.29, 31.61
See application file for complete search history.

(56) References Cited

U.S. PATENT DOCUMENTS

| | | | |
|---|---|---|---|
| 4,490,731 A | 12/1984 | Vaught | |
| 4,889,560 A | 12/1989 | Jaeger et al. | |
| 4,889,761 A | 12/1989 | Titterington et al. | |
| 5,195,430 A | 3/1993 | Rise | |
| 5,221,335 A | 6/1993 | Williams et al. | |
| 5,372,852 A | 12/1994 | Titterington et al. | |
| 5,389,958 A | 2/1995 | Bui et al. | |
| 5,534,616 A | 7/1996 | Waddington | |
| 6,309,453 B1 | 10/2001 | Banning et al. | |
| 6,472,523 B1 | 10/2002 | Banning et al. | |
| 6,521,429 B2 | 2/2003 | Honma et al. | |
| 6,547,380 B2 | 4/2003 | Smith et al. | |
| 6,860,930 B2 | 3/2005 | Wu et al. | |

(Continued)

FOREIGN PATENT DOCUMENTS

WO WO/9520614 8/1995

OTHER PUBLICATIONS

Thomas Edward Enright, et al., U.S. Appl. No. 13/095,015, filed Apr. 27, 2011, "Solventless Reaction Process," not yet published, 34 pages.

(Continued)

*Primary Examiner* — Veronica F Faison
(74) *Attorney, Agent, or Firm* — Marylou J. Lavoie

(57) ABSTRACT

A phase change ink including an amorphous compound; a crystalline compound; an optional colorant; an optional synergist; an optional dispersant; and at least one polyhydroxyalkanoate compound of the formula

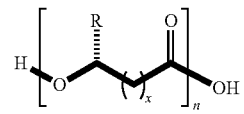

wherein R is independently selected from the group consisting of a hydrogen atom, a hydrocarbon group, a heteroatom, and combinations thereof; wherein n represents the number of repeating units of from 1 to about 35,000; and wherein x represents an integer from 1 to about 5.

17 Claims, 11 Drawing Sheets

(56) References Cited

U.S. PATENT DOCUMENTS

| | | | |
|---|---|---|---|
| 7,973,186 | B1 | 7/2011 | Goredema et al. |
| 8,002,399 | B2 | 8/2011 | Turek et al. |
| 8,137,884 | B2 | 3/2012 | Sacripante et al. |
| 8,187,780 | B2 | 5/2012 | McAneney-Lannen et al. |
| 2008/0299627 | A1 | 12/2008 | Kang et al. |
| 2010/0203439 | A1 | 8/2010 | Zhou et al. |
| 2011/0003243 | A1 | 1/2011 | Sacripante et al. |
| 2011/0130502 | A1* | 6/2011 | Turek et al. ........... 524/196 |
| 2012/0274716 | A1* | 11/2012 | McConville et al. ...... 347/102 |

OTHER PUBLICATIONS

Kentaro Morimitsu, et al., U.S. Appl. No. 13/095,028, filed Apr. 27, 2011, "Phase Change Ink," not yet published, 30 pages.

Paul McConville, et al., U.S. Appl. No. 13/095,038, filed Apr. 27, 2011, "Print Process for Phase Separation Ink," not yet published, 46 pages.

Peter G. Odell, et al., U.S. Appl. No. 13/095,043, filed Apr. 27, 2011, "Phase Separation Ink," not yet published, 67 pages.

Naveen Chopra, et al., U.S. Appl. No. 13/095,555, filed Apr. 27, 2011, "Phase Change Inks and Methods of Making the Same," not yet published, 37 pages.

Jennifer L. Belelie, et al., U.S. Appl. No. 13/095,591, filed Apr. 27, 2011, "Phase Change Ink Components and Methods of Making the Same," not yet published, 31 pages.

Jennifer L. Belelie, et al., U.S. Appl. No. 13/095,636, filed Apr. 27, 2011, "Solid Ink Compositions Comprising Crystalline-Amorphous Mixtures," not yet published, 24 pages.

Kentaro Morimitsu, et al., U.S. Appl. No. 13/095,715, filed Apr. 27, 2011, "Solid Ink Compositions Comprising Crystalline Esters of Tartaric Acid," not yet published, 29 pages.

Kentaro Morimitsu, et al., U.S. Appl. No. 13/095,770, filed Apr. 27, 2011, "Phase Change Inks and Methods of Making the Same," not yet published, 34 pages.

Kentaro Morimitsu, et al., U.S. Appl. No. 13/095,784, filed Apr. 27, 2011, "Solid Ink Compositions Comprising Amorphous Esters of Tartaric Acid," not yet published, 31 pages.

Kentaro Morimitsu, et al., U.S. Appl. No. 13/095,795, filed Apr. 27, 2011, "Solid Ink Compositions Comprising Amorphous Esters of Citric Acid," not yet published, 28 pages.

Jennifer L. Belelie, et al., U.S. Appl. No. 13/456,805, filed Apr. 26, 2012, "Phase Change Inks Comprising Organic Pigments," not yet published, 41 pages.

Chopra, et al., U.S. Appl. No. 13/456,619, filed Apr. 26, 2012, "Phase Change Ink Compositions Comprising Crystalline Diurethanes and Derivatives Thereof," not yet published, 37 pages.

Morimitsu, et al. U.S. Appl. No. 13/456,916, filed Apr. 26, 2012, "Phase Change Ink Compositions Comprising Aromatic Ethers," not yet published, 40 pages.

Morimitsu, et al. U.S. Appl. No. 13/457,221, filed Apr. 26, 2012, "Phase Change Inks Comprising Crystalline Amides," not yet published, 39 pages.

Morimitsu, et al. U.S. Appl. No. 13/457,323, filed Apr. 26, 2012, "Phase Change Ink Compositions Comprising Crystalline Sulfone Compounds and Derivatives Thereof," not yet published, 42 pages.

\* cited by examiner

PHASE CHANGE INK COMPRISING A POLYHYDROXYALKANOATE COMPOUND

BACKGROUND

Disclosed herein is a phase change ink including an amorphous compound; a crystalline compound; an optional colorant; an optional synergist; an optional dispersant; and at least one polyhydroxyalkanoate compound.

In general, phase change inks (sometimes referred to as solid inks or "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes.

The colorants can also include pigments, as disclosed in, for example, U.S. Pat. No. 5,221,335, the disclosure of which is totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Ink jetting devices are known in the art, and thus extensive description of such devices is not required herein. As described in U.S. Pat. No. 6,547,380, which is hereby incorporated herein by reference in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, which is hereby incorporated herein by reference in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

As noted, ink jet printing processes may employ inks that are solid at room temperature and liquid at elevated temperatures. For example, U.S. Pat. No. 4,490,731, which is hereby incorporated by reference herein, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

Examples of the phase change inks herein are inks that include an ink vehicle that is solid at temperatures of about 23° C. to about 27° C., for example room temperature, and specifically are solid at temperatures below about 60° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 1 to about 20 centipoise such as from about 5 to about 15 centipoise, for example from about 8 to about 12 cp, at a jetting temperature of from about 60° C. to about 100° C. such as about 80° C. to about 100° C., for example from about 90° C. to about 100° C. High energy inks are solid at a temperature below about 40° C. and have a viscosity of from about 5 to about 15 centipoise at a jetting temperature of from about 100° C. to about 180° C., for example from 120° C. to about 160° C. or from about 125° C. to about 150° C.

U.S. patent application Ser. No. 13/456,805 of Belelie et al., entitled "Phase Change Inks Comprising Organic Pigments," which is hereby incorporated by reference herein in its entirety, describes in the Abstract thereof a solid ink composition suitable for ink jet printing, including printing on coated paper substrates. In particular, the solid ink composition comprises a crystalline compound, an amorphous compound, and an organic pigment, which provides for a robust and fast crystallizing ink.

U.S. Pat. No. 8,002,399 of Turek et al., entitled "Solid Inks Incorporating A Polyhydroxyalkanoate Compound For Enhanced Properties," which is hereby incorporated by reference herein in its entirety, describes a solid phase change ink composition that includes at least one colorant, at least one polyhydroxyalkanoate compound, and, in embodiments, an ink vehicle comprising at least one branched triamide, a monoamide, and an isocyanate derived material.

Currently available phase change inks are suitable for their intended purposes. However a need remains for improved phase change inks. Further, a need remains for improved pigmented phase change inks. While previously described crystalline-amorphous inks containing dispersed organic colored pigments display an improved crystallization rate, and lightfastness as compared to certain dye based inks, there remains a need for a phase change ink that can provide improved fold offset and scratch resistance characteristics on coated substrates. There further remains a need for a pigment based phase change ink that can provide improved image robustness over certain previous phase change inks.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink including an amorphous compound; a crystalline compound; an optional colorant; an optional synergist; an optional dispersant; and at least one polyhydroxyalkanoate compound of the formula

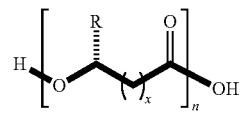

wherein R is independently selected from the group consisting of a hydrogen atom, a hydrocarbon group, a heteroatom, and combinations thereof; wherein n represents the number of repeating units of from 1 to about 35,000; and wherein x represents an integer from 1 to about 5.

Also described is a method for preparing a phase change ink composition comprising combining an amorphous compound; a crystalline compound; an optional colorant; an optional synergist; an optional dispersant; and at least one polyhydroxyalkanoate compound of the formula

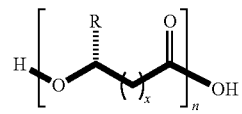

wherein R is independently selected from the group consisting of a hydrogen atom, a hydrocarbon group, a heteroatom, and combinations thereof; wherein n represents the number of repeating units of from 1 to about 35,000; and wherein x represents an integer from 1 to about 5, to produce a phase change ink composition.

Also described is an ink jet printer stick or pellet containing a phase change ink composition comprising an amorphous compound; a crystalline compound; an optional colorant; an optional synergist; an optional dispersant; and at least one polyhydroxyalkanoate compound of the formula

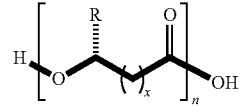

wherein R is independently selected from the group consisting of a hydrogen atom, a hydrocarbon group, a heteroatom, and combinations thereof; wherein n represents the number of repeating units of from 1 to about 35,000; and wherein x represents an integer from 1 to about 5, to produce a phase change ink composition.

DETAILED DESCRIPTION

Figure 1:
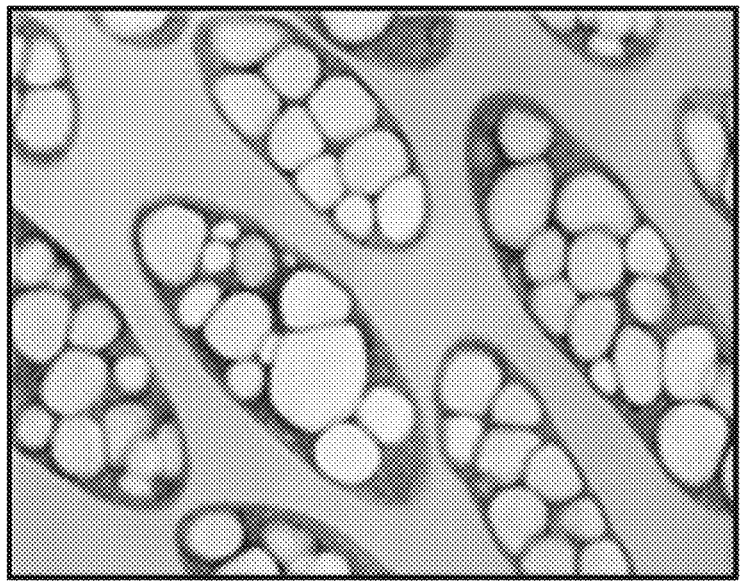
FIG. 1 illustrates polyhydroxyalkanoate granules inside bacterial cells.

A phase change ink is provided including an amorphous compound; a crystalline compound; an optional colorant; an optional synergist; an optional dispersant; and at least one polyhydroxyalkanoate compound of the formula

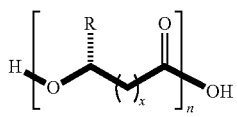

wherein R is independently selected from the group consisting of a hydrogen atom, a hydrocarbon group, a heteroatom, and combinations thereof; wherein n represents the number of repeating units of from 1 to about 35,000; and wherein x represents an integer from 1 to about 5.

In embodiments, the scratch and fold offset of the pigmented phase change inks herein has been significantly improved with the incorporation of small amounts of naturally derived polyhydroxyalkanoate bioresins. Polyhydroxyalkanoate bioresins can be obtained from Polyferm Canada under the tradename VersaMer™. In embodiments, the phase change ink compositions herein provide enhanced fold offset and scratch resistance, and improved image robustness, using a combination of amorphous component, crystalline component, optional colorant, in embodiments, pigment, optional synergist, optional dispersant, and bacterial-derived resin for enhanced properties. The phase change ink compositions herein are particularly suitable for use in applications desiring robust prints on coated substrates.

As used herein, the term "alkyl" refers to an aliphatic hydrocarbon group. The alkyl moiety may be a "saturated alkyl" group, which means that it does not contain any alkene or alkyne moieties. The alkyl moiety may also be an "unsaturated alkyl" moiety, which means that it contains at least one alkene or alkyne moiety. An "alkene" moiety refers to a group consisting of at least two carbon atoms and at least one carbon-carbon double bond, and an "alkyne" moiety refers to a group consisting of at least two carbon atoms and at least one carbon-carbon triple bond. The alkyl moiety, whether saturated or unsaturated, may be branched, straight chain, or cyclic.

In embodiments, the alkyl group may have 1 to 40 carbon atoms (whenever it appears herein, a numerical range such as "1 to 40" refers to each integer in the given range; e.g., "1 to 40 carbon atoms" means that the alkyl group may consist of 1 carbon atom, 2 carbon atoms, 3 carbon atoms, etc., up to and including 40 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 4 carbon atoms. The alkyl group of the compounds of the invention may be designated as "C1-C4 alkyl" or similar designations. By way of example only, "C1-C4 alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl.

In embodiments, the alkyl group may be substituted or unsubstituted. When substituted, any group(s) besides hydrogen can be the substituent group(s). When substituted, the substituent group(s) is(are) one or more group(s) individually and independently selected from the following non-limiting illustrative list: alkyl, cycloalkyl, hydroxy, alkoxy, cyano, halo, and amino, including mono- and di-substituted amino groups. Typical alkyl groups include, but are in no way limited to, methyl, ethyl, propyl, isopropyl, butyl, isobutyl, tertiary butyl, pentyl, hexyl, ethenyl, propenyl, butenyl, cyclopropyl, cyclobutyl, cyclopentyl, cyclohexyl, and the like. Each substituent group may be further substituted.

The term "aryl," as used herein, alone or in combination, means a carbocyclic aromatic system containing one, two or three rings wherein such rings may be attached together in a pendent manner or may be fused. The term "aryl," embraces aromatic radicals such as benzyl, phenyl, naphthyl, anthracenyl, and biphenyl.

The term "arylalkyl" as used herein, alone or in combination, refers to an aryl group attached to the parent molecular moiety through an alkyl group. The term "alkanediyl" refers to a divalent radical of an alkane group. Such alkanediyl has a general formula —Cn(RxRy)n-, where each Rx and Ry are independently a lower alkyl group or hydrogen.

Solid ink technology broadens printing capability and customer base across many markets, and the diversity of printing applications will be facilitated by effective integration of printhead technology, print process and ink materials. The solid ink compositions are characterized by being solid at room temperature (RT) (e.g., 20-27° C.) and molten at an elevated temperature at which the molten ink is applied to a substrate. While current ink options are successful for porous paper substrates, these options are not always satisfactory for coated paper substrates.

It was previously discovered that using a mixture of crystalline and amorphous small molecule compounds in solid ink formulations provides robust inks, and in particular, solid inks which demonstrate robust images on coated paper. See U.S. patent application Ser. No. 13/095,636 entitled "Solid Ink Compositions Comprising Crystalline-Amorphous Mixtures" of Jennifer L. Belelie et al., filed Apr. 27, 2011, which is hereby incorporated by reference herein in its entirety. Print samples made with such phase change inks demonstrate better robustness with respect to scratch, fold, and fold offset as compared to currently available phase change inks.

Using this approach is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature (about 140° C.).

It was further previously discovered that a robust solid ink can be obtained through a blend of crystalline and amorphous compounds. See U.S. patent application Ser. No. 13/456,805 entitled "Phase Change Inks Comprising Organic Pigments" of Jennifer L. Belelie et al., filed Apr. 26, 2012, which is hereby incorporated by reference herein in its entirety.

In embodiments, the present phase change ink compositions include a blend of (1) crystalline and (2) amorphous compounds, generally in a weight ratio of from about 60:40 to about 95:5, respectively. In more specific embodiments, the weight ratio of the crystalline to amorphous compound is from about 65:35 to about 95:5, or is from about 70:30 to about 90:10, or is from about 70:30 to about 80:20. In other embodiments, the crystalline and amorphous compounds are blended in a weight ratio of from about 1.5 to about 20, or from about 2.0 to about 10, respectively.

Each compound or component imparts specific properties to the solid inks, and the resulting inks incorporating a blend of these amorphous and crystalline compounds demonstrate excellent robustness on uncoated and coated substrates. The crystalline compound in the ink formulation drives the phase change through rapid crystallization on cooling. The crystalline compound also sets up the structure of the final ink film and creates a hard ink by reducing the tackiness of the amorphous compound. The amorphous compounds provide tackiness and impart robustness to the printed ink.

As used herein, the term "alkyl" refers to an aliphatic hydrocarbon group. The alkyl moiety may be a "saturated alkyl" group, which means that it does not contain any alkene or alkyne moieties. The alkyl moiety may also be an "unsaturated alkyl" moiety, which means that it contains at least one alkene or alkyne moiety. An "alkene" moiety refers to a group consisting of at least two carbon atoms and at least one carbon-carbon double bond, and an "alkyne" moiety refers to a group consisting of at least two carbon atoms and at least one carbon-carbon triple bond. The alkyl moiety, whether saturated or unsaturated, may be branched, straight chain, or cyclic.

The alkyl group may have 1 to 40 carbon atoms (whenever it appears herein, a numerical range such as "1 to 40" refers to each integer in the given range; e.g., "1 to 40 carbon atoms" means that the alkyl group may consist of 1 carbon atom, 2 carbon atoms, 3 carbon atoms, etc., up to and including 40 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 4 carbon atoms. The alkyl group of the compounds herein may be designated as "C1-C5 alkyl" or similar designations. By way of example only, "C1-C4 alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl. The alkyl group may be substituted or unsubstituted. When substituted, any group(s) besides hydrogen can be the substituent group(s). When substituted, the substituent group(s) is(are) one or more group(s) individually and independently selected from the following non-limiting illustrative list: alkyl, cycloalkyl, hydroxy, alkoxy, cyano, halo, and amino, including mono- and di-substituted amino groups. Typical alkyl groups include, but are in no way limited to, methyl, ethyl, propyl, isopropyl, butyl, isobutyl, tertiary butyl, pentyl, hexyl, ethenyl, propenyl, butenyl, cyclopropyl, cyclobutyl, cyclopentyl, cyclohexyl, and the like. Each substituent group may be further substituted.

The term "aryl," as used herein, alone or in combination, means a carbocyclic aromatic system containing one, two or three rings wherein such rings may be attached together in a pendent manner or may be fused. The term "aryl," embraces aromatic radicals such as benzyl, phenyl, naphthyl, anthracenyl, and biphenyl.

The term "arylalkyl" as used herein, alone or in combination, refers to an aryl group attached to the parent molecular moiety through an alkyl group.

The Amorphous Compound.

In embodiments, the amorphous compound of the phase change inks herein comprises a first ester of tartaric acid of the formula

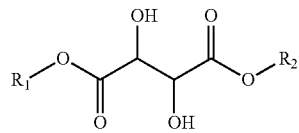

or a first ester of citric acid of the formula

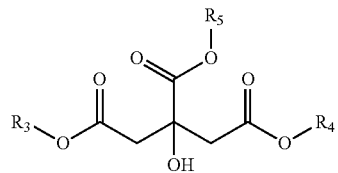

wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group. In certain embodiments, each $R_1$, $R_2$, $R_3$, $R_4$, and $R_5$ is independently a cyclohexyl group optionally substituted with one or more alkyl groups selected from methyl, ethyl, n-propyl, isopropyl, n-butyl and t-butyl. In certain embodiments, each $R_1$, $R_2$, $R_3$, $R_4$, and $R_5$ is independently a cyclohexyl group optionally substituted with one or more alkyl groups selected from methyl, ethyl, n-propyl, isopropyl, n-butyl and t-butyl.

In certain embodiments of the formula

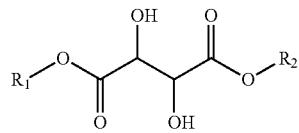

one of $R_1$ and $R_2$ is 2-isopropyl-5-methylcyclohexyl, and the other one of $R_1$ and $R_2$ is 2-isopropyl-5-methylcyclohexyl, 4-t-butylcyclohexyl, or cyclohexyl, or one of $R_1$ and $R_2$ is 4-t-butylcyclohexyl, and the other one of $R_1$ and $R_2$ is cyclohexyl. In certain embodiments, $R_1$ and $R_2$ are each 2-isopropyl-5-methylcyclohexyl. In certain embodiments, $R_1$ is 2-isopropyl-5-methylcyclohexyl and $R_2$ is 4-t-butylcyclohexyl. In certain other embodiments, $R_1$ is 2-isopropyl-5-methylcyclohexyl and $R_2$ is cyclohexyl. In still other embodiments, $R_1$ is 4-t-butylcyclohexyl and $R_2$ is cyclohexyl.

In certain embodiments of the formula

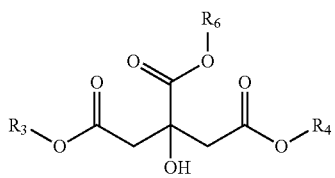

one of $R_3$, $R_4$ and $R_5$ is 2-isopropyl-5-methylcyclohexyl, and the other one of $R_3$, $R_4$ and $R_5$ is 2-isopropyl-5-methylcyclohexyl, 4-t-butylcyclohexyl, or cyclohexyl, or one of $R_3$, $R_4$ and $R_5$ is 4-t-butylcyclohexyl, and the other one of $R_3$, $R_4$ and $R_5$ is cyclohexyl. In certain embodiment, $R_3$, $R_4$ and $R_5$ are each 2-isopropyl-5-methylcyclohexyl. In certain embodiment, $R_3$ is 2-isopropyl-5-methylcyclohexyl and $R_4$ and $R_5$ are each 4-t-butylcyclohexyl. In certain embodiment, $R_3$ is 2-isopropyl-5-methylcyclohexyl and $R_4$ and $R_5$ are each cyclohexyl. In certain embodiment, $R_1$ is 4-t-butylcyclohexyl and $R_4$ and $R_5$ are each cyclohexyl.

In certain embodiment, the amorphous compound is selected from the group consisting of bis(2-isopropyl-5-methylcyclohexyl) L-tartrate or (4-t-butylcyclohexyl)(cyclohexyl)-L-tartrate, and any stereoisomers and mixtures thereof.

Some suitable amorphous materials are disclosed in U.S. patent application Ser. No. 13/095,784 to Morimitsu et al., which is hereby incorporated by reference in its entirety. The amorphous materials may comprise an ester of tartaric acid of the formula

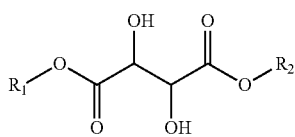

wherein $R_1$ and $R_2$ each, independently of the other, meaning that they can be the same or different, is selected from the group consisting of alkyl group, wherein the alkyl portion can be straight, branched or cyclic, saturated or unsaturated, substituted or unsubstituted, having from about 1 to about 40 carbon atoms or an substituted or unsubstituted aromatic or heteroaromatic group. In certain embodiments, each $R_1$ and $R_2$ is independently a cyclohexyl group optionally substituted with one or more alkyl group(s) selected from methyl, ethyl, n-propyl, isopropyl, n-butyl and t-butyl. In certain embodiments, R1 and R2 are each 2-isopropyl-5-methylcyclohexyl.

The tartaric acid backbone can be selected from L-(+)-tartaric acid, 0-(−)-tartaric acid, DL-tartaric acid, or mesotartaric acid, and mixtures thereof. Depending on the R groups and the stereochemistries of tartaric acid, the esters could form crystals or stable amorphous compounds. In specific embodiments, the amorphous compound is selected from the group consisting of di-L-menthyl L-tartrate, di-DL-menthyl L-tartrate (DMT), di-L-menthyl DL-tartrate, di-DL-menthyl DL-tartrate, and any stereoisomers and mixtures thereof.

These materials show, relatively low viscosity (<102 centipoise (cps), or from about 1 to about 100 cps, or from about 5 to about 95 cps) near the jetting temperature (about 140° C., or from about 100 to about 140° C., or from about 105 to about 140° C.) but very high viscosity (>105 cps) at room temperature.

To synthesize the amorphous component, tartaric acid can be reacted with a variety of alcohols to make di-esters as shown in the synthesis scheme shown in U.S. patent application Ser. No. 13/095,784. Suitable alcohols to be used with the present embodiments may be selected from the group consisting of alkyl alcohol, wherein the alkyl portion of the alcohol can be straight, branched or cyclic, saturated or unsaturated, substituted or unsubstituted, having from about 1 to about 40 carbon atoms, or a substituted or unsubstituted aromatic or heteroaromatic group, and mixtures thereof. A variety of alcohols may be used in the esterification such as, for example, menthol, isomenthol, neomenthol, isoneomenthol, and any stereoisomers and mixtures thereof. Mixtures of aliphatic alcohols may be used in the esterification. For example, a mixture of two aliphatic alcohols may be used in the esterification. The molar ratios of the aliphatic alcohols may be from 25:75 to 75:25, from 40:60 to 60:40, or about 50:50. Examples of suitable aliphatic alcohol whose mixtures form amorphous compounds when reacted with tartaric acid include cyclohexanol and substituted cyclohexanol (e.g., 2, 3 or 4-tert-butyl-cyclohexanol).

In embodiments, two or more molar equivalents of alcohol may be used in the reaction to produce the di-esters of tartaric acid. If one molar equivalent of alcohol is used, the result is mostly mono-esters.

Other suitable amorphous components for the phase change inks herein include those disclosed in U.S. patent application Ser. No. 13/095,795 to Morimitsu et al., which is hereby incorporated by reference in its entirety. The amorphous materials may comprise a compound of the formula

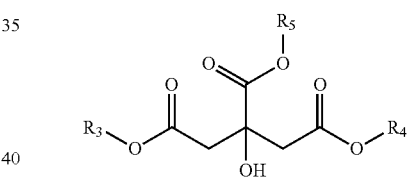

wherein $R_3$, $R_4$ and $R_5$ are independently an alkyl group, wherein the alkyl can be straight, branched or cyclic, saturated or unsaturated, substituted or unsubstituted, having from about 1 to about 40 carbon atoms, or an substituted or unsubstituted aromatic or heteroaromatic group, and mixtures thereof.

These amorphous materials can be synthesized by an esterification reaction of citric acid. In particular, citric acid can be reacted with a variety of alcohols to make tri-esters according to the synthesis scheme disclosed therein. In embodiments, the phase change ink composition is obtained by using amorphous compounds synthesized from citric acid and at least one alcohol in an esterification reaction.

The amorphous compound can be present in any suitable or desired amount. In embodiments, the amorphous material is present an amount of from about 5 percent to about 40 percent by weight, or from about 5 percent to about 35 percent by weight, or from about 10 percent to about 30 percent by weight of the total weight of the ink composition.

The Crystalline Compound.

In embodiments, the phase change ink compositions herein include a crystalline compound comprising a second ester of tartaric acid of the formula

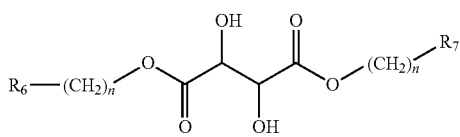

wherein each $R_6$ and $R_7$ is independently an aryl or a heteroaryl optionally substituted with a lower alkyl and alkoxy, each n is independently 0 to 3. In certain embodiments, each $R_6$ and $R_7$ is independently an optionally substituted aryl, such as a phenyl. In certain embodiments, each $R_6$ and $R_7$ is independently not substituted, or substituted with methyl, ethyl, isopropyl, methoxy or ethoxy. In certain embodiments, each $R_6$ and $R_7$ is independently a phenyl optionally substituted with methyl or methoxy.

In certain embodiments, each $R_6$ and $R_7$, independently is selected from the group consisting of

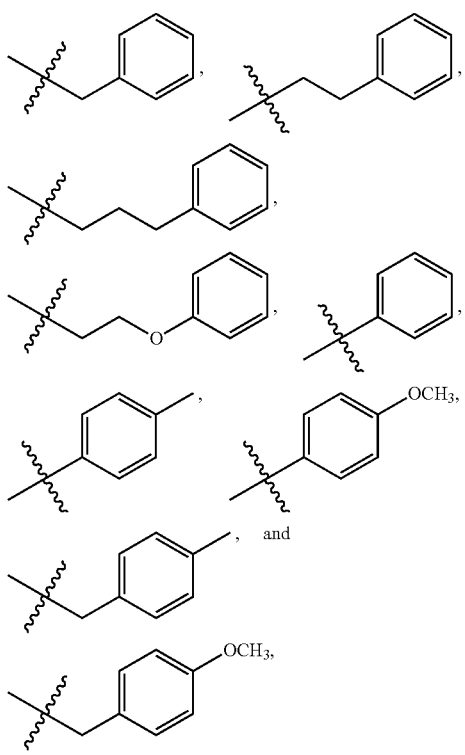

and mixtures thereof, wherein ~~~ represents the point of attachment of the $R_6$ and $R_7$ group to the compound.

In certain embodiments, the tartaric acid backbone is selected from L-(+)-tartaric acid, D-(−)-tartaric acid, DL-tartaric acid, or mesotartaric acid, and mixtures thereof.

In embodiments, the crystalline component may comprise amide, aromatic ester, linear diester, urethanes, sulfones, tartaric acid ester derivatives with aromatic groups, or mixtures thereof.

Suitable crystalline components include those disclosed in U.S. patent application Ser. No. 13/457,221 to Morimitsu et al., which is hereby incorporated by reference herein in its entirety. These crystalline materials comprise the following structure:

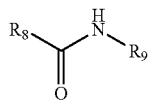

wherein $R_8$ and $R_9$ can be the same or different, each $R_8$ and $R_9$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, from about 6 to about 20 carbon atoms, or from about 6 to about 10 carbon atoms.

Suitable crystalline components also include those disclosed in U.S. patent application Ser. No. 13/456,916 to Morimitsu et al., which is hereby incorporated by reference herein in its entirety. These crystalline materials comprise the following structure:

$$R_{10}-O-[(CH_2)_2O]_p-R_{11}$$

wherein $R_{10}$ and $R_{11}$ can be the same or different, and wherein each $R_{10}$ and $R_{11}$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, or about 6 to about 20 carbon atoms, or from about 6 to about 10 carbon atoms, although the numbers can be outside of these ranges, and mixtures thereof, provided that at least one of $R_{10}$ and $R_{11}$ is an aromatic group; and p is 0 or 1.

Examples of crystalline aromatic ether include, but are not limited to,

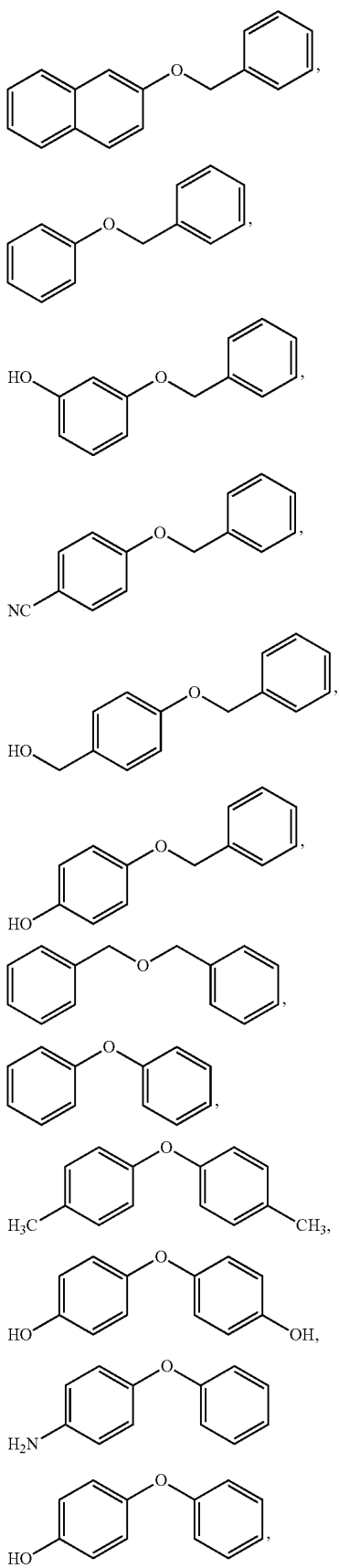

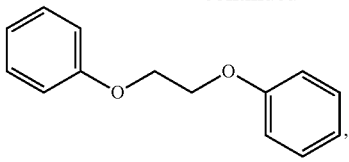

and mixtures thereof.

Suitable crystalline components also include those disclosed in U.S. patent application Ser. No. 13/095,555 to Chopra et al., which is hereby incorporated by reference herein in its entirety. These crystalline materials comprise an ester of an aliphatic linear diacid having the following structure:

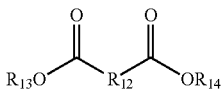

wherein $R_{12}$ may be substituted or unsubstituted alkyl chain and is selected from the group consisting of $-(CH_2)_1-$ to $-(CH_2)_{12}-$, and wherein $R_{13}$ and $R_{14}$, each independently of the other, is selected from the group consisting of a substituted or unsubstituted aromatic or heteroaromatic group, substituents including alkyl groups, wherein the alkyl portion can be straight, branched or cyclic.

Suitable crystalline components also include those disclosed in U.S. patent application Ser. No. 13/456,619 to Chopra et al., which is hereby incorporated by reference herein in its entirety. These crystalline materials comprise diurethanes having the following structure:

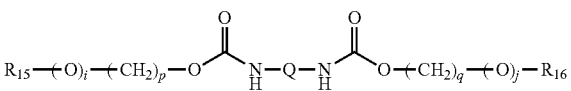

wherein Q is alkanediyl; each $R_{15}$ and $R_{16}$ is independently phenyl or cyclohexyl optionally substituted with one or more alkyl; i is 0 or 1; j is 0 or 1; p is 1 to 4; q is 1 to 4. In certain of such embodiments, each $R_{15}$ and $R_{16}$ is independently phenyl or cyclohexyl optionally substituted with one or more methyl or ethyl. In certain of such embodiments, $R_{15}$ and $R_{16}$ is phenyl. In certain embodiments, Q is $-(CH_2)_n-$ and n is 4 to 8. In certain of such embodiments, n is 6. In certain embodiments, each $R_{15}$ and $R_{16}$, is independently selected from benzyl, 2-phenylethyl, 2-phenoxyethyl, $C_6H_5(CH_2)_4-$, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl.

Suitable crystalline components also include those disclosed in U.S. patent application Ser. No. 13/457,323 to Morimitsu et al., which is hereby incorporated by reference herein in its entirety. These crystalline component being a sulfone compound having the following structure:

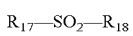

wherein $R_{17}$ and $R_{18}$ can be the same or different, and wherein $R_{17}$ and $R_{18}$ each, independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, although the numbers can be outside of these ranges, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms, although the numbers can be outside of these ranges; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to from about 40 carbon atoms, from about 6 to about 20 carbon atoms, or about 6 to about 10 carbon atoms, although the numbers can be outside of these ranges, and mixtures thereof.

In certain embodiments, each $R_{17}$ and $R_{18}$ is independently alkyl, or aryl, optionally substituted with one or more halo, amino, hydroxy, or cyano groups and combinations thereof, or $R_{17}$ and $R_{18}$ taken together with the S atom to which they are attached form a heterocyclic ring. In certain of such embodiments, each $R_{17}$ and $R_{18}$ is independently an optionally substituted alkyl, such as, methyl, ethyl, isopropyl, n-butyl, or t-butyl. In certain of such embodiments, each $R_6$ and $R_7$ is independently an optionally substituted aryl, such as, phenyl, or benzyl. In certain embodiments, each $R_{17}$ and $R_{18}$ is independently substituted with one or more amino, chloro, fluoro, hydroxy, cyano or combinations thereof. Substitution on the aryl groups may be made in the ortho, meta or para position of the phenyl groups and combinations thereof. In certain embodiments, each $R_{17}$ and $R_{18}$ is independently 2-hydroxyethyl, or cyanomethyl.

In certain embodiments, the crystalline component may include diphenyl sulfone, dimethyl sulfone, bis(4-hydroxyphenyl)sulfone, bis(4-aminophenyl)sulfone, bis(3-aminophenyl)sulfone, bis(4-chlorophenyl)sulfone, bis(4-fluorophenyl)sulfone, 2-hydroxyphenyl-4-hydroxyphenyl sulfone, phenyl-4-chlorophenyl sulfone, phenyl-2-aminophenyl sulfone, bis(3-amino-4-hydroxyphenyl)sulfone, dibenzyl sulfone, methylethyl sulfone, diethyl sulfone, methylisopropyl sulfone, ethylisopropyl sulfone, di-n-butyl sulfone, divinyl sulfone, methyl-2-hydroxymethyl sulfone, methylchloromethyl sulfone, sulfolane, 3-sulfolene, and mixtures thereof.

In embodiments, the crystalline compound may comprise an ester of tartaric acid of the following formula:

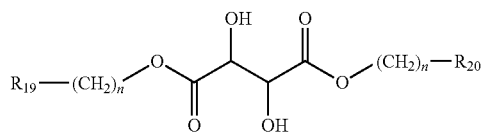

wherein each $R_{19}$ and $R_{20}$ is independently an aryl or a heteroaryl optionally substituted with a lower alkyl and alkoxy, each n is independently 0 to 3. In certain embodiments, each $R_{19}$ and $R_{20}$ is independently an optionally substituted aryl, such as a phenyl. In certain embodiments, each $R_{19}$ and $R_{20}$ is independently not substituted, or substituted with methyl, ethyl, isopropyl, methoxy or ethoxy. In certain embodiments, each $R_{19}$ and $R_{20}$ is independently a phenyl optionally substituted with methyl or methoxy.

In certain embodiments, each $R_{19}$ and $R_{20}$, independently is selected from the group consisting of

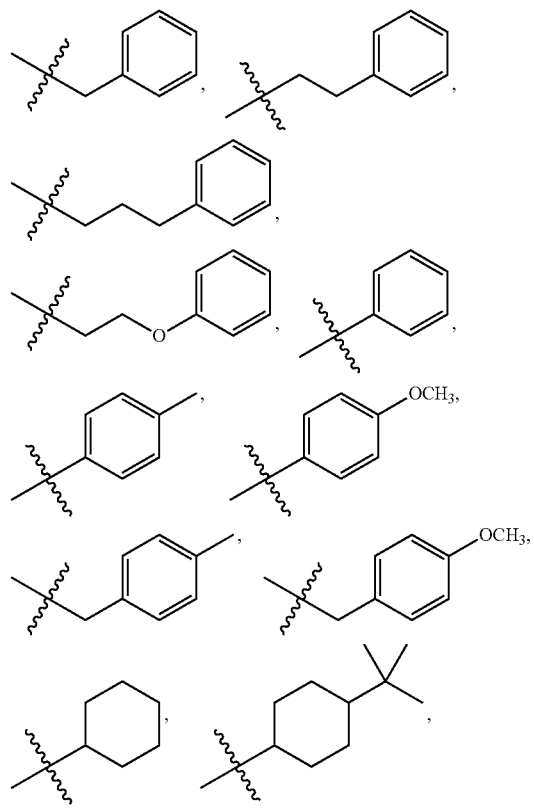

and mixtures thereof.

In certain embodiments, the tartaric acid backbone is selected from L-(+)-tartaric acid, D-(−)-tartaric acid, DL-tartaric acid, or mesotartaric acid, and mixtures thereof.

In certain embodiments, the crystalline compound is selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis(4-methylphenyl) L-tartrate, bis(4-methoxylphenyl) L-tartrate, bis(4-methylbenzyl) L-tartrate, bis(4-methoxylbenzyl) L-tartrate, and mixtures thereof.

The crystalline materials show sharp crystallization, relatively low viscosity ($\leq 10^1$ centipoise (cps), or from about 0.5 to about 20 cps, or from about 1 to about 15 cps) at a temperature of about 140° C., but very high viscosity (>$10^6$ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The $\Delta T$ between $T_{melt}$ and $T_{crys}$ is less than about 55° C.

The crystalline compound can be present in any suitable or desired amount. In embodiments, the crystalline material is present an amount of from about 60 percent to about 95 percent by weight, or from about 65 percent to about 95 percent by weight, or from about 70 percent to about 90 percent by weight of the total weight of the ink composition.

The crystalline and amorphous materials of the present embodiments were found to be miscible with one another and the resulting ink compositions formulated with the crystalline and amorphous materials show good rheological profiles. Image samples created by the phase change ink composition on coated paper by K-proof exhibit excellent robustness. A K-proofer is a common test fixture in a print shop. In this case the proofer has been modified to heat the printing plate to melt the phase change ink. The K-Proofer used has three rectangular gravure patterns each approximately 9.4×4.7 centimeters. The cell density of the first rectangle is nominally 100%, the second 80%, and the third 60%. In practice this K-proof plate results in films (or pixels) of about 5 microns in thickness (or height). Test ink is spread over the heated gravure plate and a test print is made by passing a wiping blade across the plate surface immediately follow by a rubber roll upon which a test paper has been secured. As the paper roll passes ink is transferred from the gravure cells to the paper. Furthermore, using the present crystalline and amorphous materials has additional advantages of being low cost, and from a potentially bio-derived source.

The phase change ink compositions herein comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the present tartrate compounds and derivatives thereof, which provide crystalline components for the phase change inks, have been discovered to produce robust inks having desirable rheological profiles and that meet the many requirements for inkjet printing.

The phase change ink compositions may also comprise the crystalline and amorphous material in combination with a colorant. The present embodiments comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the resulting ink compositions comprising a blend of the crystalline and amorphous compounds show good rheological profiles and that meet the many requirements for ink jet printing.

Synthesis of Tartaric Acid Esters.

Tartaric acid can be reacted with a variety of alcohols to make di-esters as shown in the synthesis scheme below, which illustrates the preparation of a tartaric acid di-ester compound of the present embodiments. The esterification can be conducted by a one-step reaction:

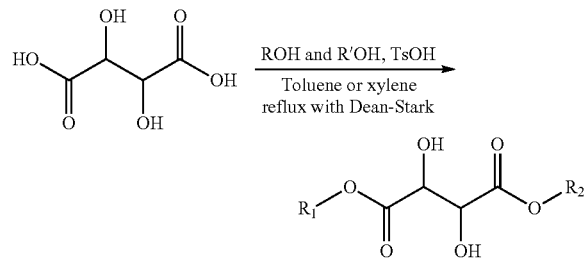

wherein ROH and R'OH may be the same or different.

To synthesize the amorphous materials, a variety of aliphatic alcohols may be used in the esterification such as, for example, menthol, isomenthol, neomenthol, isoneomenthol, and any stereoisomers and mixtures thereof.

In embodiments, menthol is selected as the alcohol. Both tartaric acid and menthol have stereoisomers, therefore there are many possible combinations in terms of chirality. In embodiments, three combinations of tartaric acid and menthol (di-L-menthyl L-tartrate, di-DL-menthyl L-tartrate, di-L-menthyl DL-tartrate) can be synthesized. Surprisingly, all combinations, even in the combination of optically pure L-menthol and L-tartaric acid, made amorphously setting materials. Suitable alcohols to be used with the present embodiments may be selected from the group consisting of alkyl alcohol, wherein the alkyl portion of the alcohol can be straight, branched or cyclic, saturated or unsaturated, substituted or unsubstituted, having from about 1 to about 16 carbon atoms.

To synthesize the crystalline materials, a variety of aromatic alcohols may be used in the esterification. Non-limiting exemplary aromatic alcohols include the following

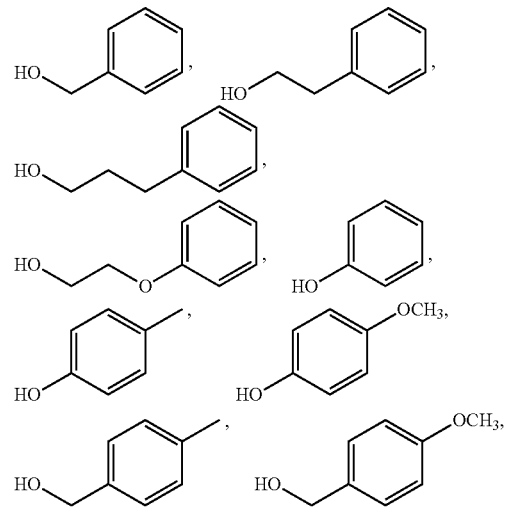

and any stereoisomers and mixtures thereof.

In embodiments, two or more molar equivalents of alcohol may be used in the reaction to produce the di-esters of tartaric acid. If one molar equivalent of alcohol is used, the result is mostly mono-esters.

Colorant.

The phase change ink compositions can include any suitable or desired colorant such as colorants selected from the group consisting of traditional dyes, pigments, and mixtures and combinations thereof present in any suitable or desired amount. If more than one colorant is included, the total amount of colorant present in the phase change ink composition can be any desired or effective amount to obtain the desired color or hue, in embodiments from about 0.1 to about 50 percent, or from about 0.1 percent to about 20 percent total colorant by weight based on the total weight of the phase change ink composition.

Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon® Red 492 (BASF); Orasol® Red G (Pylam Products); Direct Brilliant Pink B (Oriental Giant Dyes); Direct Red 3BL (Classic Dyestuffs); Supranol® Brilliant Red 3BW (Bayer AG); Lemon Yellow 6G (United Chemie); Light Fast Yellow 3G (Shaanxi);

Aizen Spilon Yellow C-GNH (Hodogaya Chemical); Bemachrome Yellow GD Sub (Classic Dyestuffs); Cartasol® Brilliant Yellow 4GF (Clariant); Cibanone Yellow 2G (Classic Dyestuffs); Orasol® Black RLI (BASF); Orasol® Black CN (Pylam Products); Savinyl Black RLSN (Clariant); Pyrazol Black BG (Clariant); Morfast® Black 101 (Rohm & Haas); Diaazol Black RN (ICI); Thermoplast® Blue 670 (BASF); Orasol® Blue GN (Pylam Products); Savinyl Blue GLS (Clariant); Luxol Fast Blue MBSN (Pylam Products); Sevron Blue 5GMF (Classic Dyestuffs); Basacid® Blue 750 (BASF); Keyplast Blue (Keystone Aniline Corporation); Neozapon® Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen® Blue FF-4012 (BASF); Fastol® Black BR (C.I. Solvent Black 35) (Chemische Fabriek Triade BV); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby incorporated by reference herein in their entireties, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint® Orange X-38, uncut Reactint® Blue X-17, Solvent Yellow 162, Acid Red 52, Solvent Blue 44, and uncut Reactint® Violet X-80.

In specific embodiments, the phase change ink compositions herein are pigmented phase change ink compositions. In embodiments, the pigment is selected from the group consisting of metal phthalocyanine, metal-free phthalocyanine, and mixtures and combinations thereof. In certain embodiments, the phase change ink composition includes a pigment selected from the group consisting of cyan, green, blue, black, carbon black, Pigment Blue, copper phthalocyanine, and mixtures and combinations thereof. In a specific embodiment, the pigment is a cyan pigment.

Suitable pigments that can be used in embodiments herein include, for example, PALIOGEN® Violet 5100 (commercially available from BASF); PALIOGEN® Violet 5890 (commercially available from BASF); HELIOGEN® Green L8730 (commercially available from BASF); LITHOL® Scarlet D3700 (commercially available from BASF); SUNFAST® Blue 15:4 (commercially available from Sun Chemical); HOSTAPERM® Blue B2G-D (commercially available from Clariant); HOSTAPERM® Blue B4G (commercially available from Clariant); Permanent Red P-F7RK; HOSTAPERM® Violet BL (commercially available from Clariant); LITHOL® Scarlet 4440 (commercially available from BASF); Bon Red® C (commercially available from Dominion Color Company); ORACET® Pink RF (commercially available from Ciba); PALIOGEN® Red 3871 K (commercially available from BASF); SUNFAST® Blue 15:3 (commercially available from Sun Chemical); PALIOGEN® Red 3340 (commercially available from BASF); SUNFAST® Carbazole Violet 23 (commercially available from Sun Chemical); LITHOL® Fast Scarlet L4300 (commercially available from BASF); SUNBRITE® Yellow 17 (commercially available from Sun Chemical); HELIOGEN® Blue L6900, L7020 (commercially available from BASF); SUNBRITE® Yellow 74 (commercially available from Sun Chemical); SPECTRA® PAC C Orange 16 (commercially available from Sun Chemical); HELIOGEN® Blue K6902, K6910 (commercially available from BASF); SUNFAST® Magenta 122 (commercially available from Sun Chemical); HELIOGEN® Blue D6840, D7080 (commercially available from BASF); Sudan Blue OS (commercially available from BASF); NEOPEN® Blue FF4012 (commercially available from BASF); PV Fast Blue B2GO1 (commercially available from Clariant); IRGALITE® Blue BCA (commercially available from Ciba); PALIOGEN® Blue 6470 (commercially available from BASF); Sudan Orange G (commercially available from Aldrich), Sudan Orange 220 (commercially available from BASF); PALIOGEN® Orange 3040 (BASF); PALIOGEN® Yellow 152, 1560 (commercially available from BASF); LITHOL® Fast Yellow 0991 K (commercially available from BASF); PALIOTOL® Yellow 1840 (commercially available from BASF); NOVOPERM® Yellow FGL (commercially available from Clariant); Ink Jet Yellow 4G VP2532 (commercially available from Clariant); Toner Yellow HG (commercially available from Clariant); Lumogen® Yellow D0790 (commercially available from BASF); Suco-Yellow L1250 (commercially available from BASF); Suco-Yellow D1355 (commercially available from BASF); Suco Fast Yellow D1 355, D1 351 (commercially available from BASF); HOSTAPERM® Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL® Pink D4830 (commercially available from BASF); CINQUASIA® Magenta (commercially available from DU PONT); PALIOGEN® Black L0084 (commercially available from BASF); Pigment Black K801 (commercially available from BASF); and carbon blacks such as REGAL® 330 (commercially available from Cabot), Nipex® 150 (commercially available from Degussa) Carbon Black 5250 and Carbon Black 5750 (commercially available from Columbia Chemical), and the like, as well as mixtures thereof.

The pigment can be provided in the phase change ink composition in any suitable or desired amount. In embodiments, the pigment can be present in an amount of from about 0.1 to about 20 percent, or from about 0.5 percent to about 5 percent, or about 0.75 to about 3 percent total pigment, based on the total weight of the phase change ink composition.

Synergist.

Any suitable or desired synergist can be employed. In embodiments, a copper phthalocyanine derivative is employed as a synergist for improving dispersion stability of pigmented phase change inks, in embodiments cyan solid inks. In embodiments, the synergist is a compound of the formula

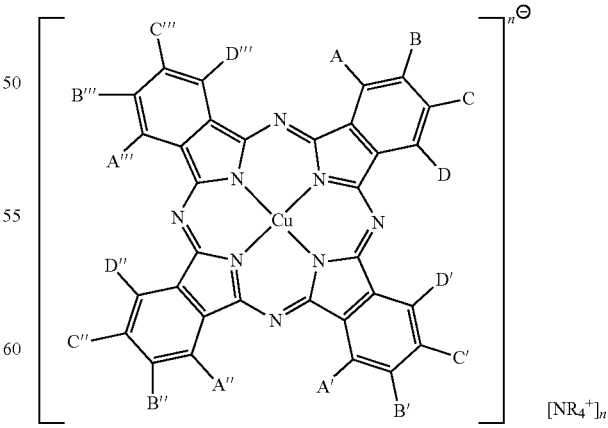

wherein at least one of A, B, C, and D, A', B', C', and D', A", B", C", and D", A'", B'", C'", and D'" are present, and wherein, B, C, and D, A', B', C', and D', A", B", C", and D", A'", B'", C'", and D''', are each independently selected from the group consisting of hydrogen, SO$_3$H, and SO$_3^-$, wherein, in certain embodiments, at least one of these substituents is SO$_3^-$, wherein, in certain other embodiments, only one of A, B, C, and D, A', B', C', and D', A", B", C", and D", A''', B''', C''', and D''' is substituted, wherein in other embodiments, only of A, B, C, and D, A', B', C', and D', A", B", C", and D", A''', B''', C''', and D''' is substituted with a group other than hydrogen, and in further embodiments only one of A, B, C, and D, A', B', C', and D', A", B", C", and D", A''', B''', C''', and D''' is substituted with SO$_3^-$;

wherein, in certain other embodiments, one (and only one) of A, B, C, or D is substituted with a group other than hydrogen, and wherein in certain embodiments that group is an SO$_3^-$ group, and only one of A', B', C', and D', A", B", C" is substituted with a group other than hydrogen, and wherein in certain embodiments that group is an SO$_3^-$ group, and wherein only one of A''', B''', C''', and D''' is substituted with a group other than hydrogen, and wherein in certain embodiments that group is an SO$_3^-$ group, wherein n is any suitable integer, wherein n indicates the charge on the phthalo portion of the structure and n indicates the number of NR$_4^+$ components, in embodiments, wherein, n is mixture of from 0, 1, 2, 3, 4, or greater, wherein, in embodiments, n is a mixture of 0, 1, and 2;

wherein, in embodiments, the synergist comprises a mixture of compounds wherein n is a mixture of from 0, 1, 2, 3, 4, or greater, or wherein n is a mixture of 0, 1, and 2.

wherein R is independently selected from hydrogen, an alkyl group, including linear, branched, saturated, unsaturated, cyclic, substituted, and unsubstituted alkyl groups, and wherein hetero atoms, such as oxygen, nitrogen, sulfur, silicon, phosphorus, boron, may optionally be present in the alkyl group, having from about 1 to about 50 carbon atoms, wherein, if substituted, substitutions can be alkyl or phenyl, and wherein, in embodiments, R is an alkyl chain having 18 carbon atoms;

and wherein, in embodiments, the synergist comprises mixtures of compounds wherein n is 0, 1, 2, 3, 4 or greater; and wherein, in embodiments, n is a mixture of from 0, 1, 2, 3, 4, or greater, wherein, in embodiments, n is a mixture of 0, 1, and 2.

Dispersant.

The phase change ink compositions herein can contain a dispersant. Any suitable or desired dispersant can be employed. In embodiments, the dispersant can be a dispersant described in U.S. Pat. No. 7,973,186 of Adela Goredema, et al., which is hereby incorporated by reference herein in its entirety. In specific embodiments, the dispersant is a compound of the formula

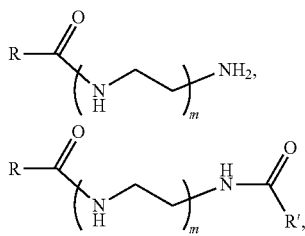

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

The dispersant can optionally be a polymeric dispersant such as those sold under the name Solsperse®, in embodiments, Solsperse® 1700, Solsperse® 32000, Solsperse® 13240, available from The Lubrizol Corporation.

The dispersant can be provided in the phase change ink composition in any suitable or desired amount. In embodiments, the dispersant can be present in an amount of from about 1 to about 500 percent, or from about 10 to about 300 percent, or from about 30 to about 200 percent total dispersant, based on the total weight of the pigment in the phase change ink composition.

Polyhydroxyalkanoate.

One group out of many possible groups of biomaterials was selected to demonstrate the feasibility of the present disclosure which included a group of natural polyesters referred to as polyhydroxyalkanoates (PHAs). These polymers are manufactured by a large scale fermentation process not unlike the brewing of beer but which involves the production of the polymer inside the cells of bacteria grown in high densities and containing as much as 90% of their dry weight as polymer. FIG. 1 illustrates PHA granules in bacteria wherein the PHA granules serve as an intracellular food and energy reserve. PHAs are produced by the cell in response to a nutrient limitation in the environment (generally phosphorous, nitrogen, or oxygen) in order to prevent starvation if an essential element becomes unavailable. They are considered valuable alternatives for fossil oil-derived plastics, because they can be produced from renewable resources and are biodegradable.

The phase change ink compositions herein include at least one polyhydroxyalkanoate compound of the formula

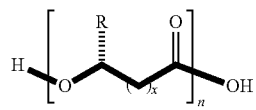

wherein R is independently selected from, the group consisting of a hydrogen atom, a hydrocarbon group, a heteroatom, and combinations thereof, and wherein n represents the number of repeating units and is an integer of from 1 to about 35,000, and wherein x represents an integer from 1 to about 5.

All natural PHAs have the same configuration for the chiral center at the 3 position and are completely isotactic. This is important for their physical properties, biosynthesis, and biodegradation. In embodiments, poly(3-hydroxyheptanoic acid co-3-hydroxynonanoic acid) or P(HHp-co-HN), likely produced by the bacteria *Pseudomonas oleovorans* grown on alkanes is selected for the phase change ink compositions herein. The molar percentage of monomer units can be found in Table 1.

TABLE 1

| Repeating Unit | Molar Percentage (%) |
|---|---|
| 3-hydroxynonanoate (C9) | 73 |
| 3-hydroxyheptanoate (C7) | 26 |
| 3-hydroxyvalerate (C5) | 0.7 |
| 3-hydroxyalkanoate (C6, C8, and C10) | 0.3 |

This semi-crystalline polyester has a low Tg of −43° C., a low Tm of 47° C., a Mw of 101.3 kDa, and an Mn of 50.1 kDa.

In embodiments, the PHAs possess lower melting temperature and enable the compatibilization of other ink components and the extending of some of its attributes to the entire ink, including no or very low shrinkage from its melting/recrystallization phase and good elasticity and toughness.

In embodiments, R can be a hydrogen atom, a hydrocarbon group, a heteroatom, and n is the number of repeating units of from 1 to about 35,000, such as from about 2 to about 30,000, from about 5 to about 10,000, from about 5 to about 8,000, from about 5 to about 2,000, from about 5 to about 1,000, from about 8 to about 500, from about 10 to about 200 or from about 10 to about 75; and x is the number of repeating methyl units of from 1 to about 5, such as from 1 to about 4, from 2 to about 4 or from 1 to about 3.

Unless otherwise indicated, in identifying the substituents for R, the phrase "hydrocarbon group" encompasses both unsubstituted hydrocarbon groups and substituted hydrocarbon groups. The hydrocarbon group can be a saturated or an unsaturated hydrocarbon group. The unsubstituted hydrocarbon group may contain, for example, from 1 to about 20 carbon atoms, from 1 to about 15 carbon atoms, from 1 to about 15 carbon atoms and from 1 to about 13 carbon atoms, and may be linear, branched or cyclic. Examples of the unsubstituted hydrocarbon groups may include, for example, a straight chain alkyl group, a branched alkyl group, a cycloalkyl group, an aryl group, an alkylaryl group, an arylalkyl group, a straight chain alkenyl group, and a branched alkenyl group. The unsubstituted hydrocarbon group may also be a branched or straight chain alkyne. Exemplary alkyl groups include methyl, ethyl, propyl, butyl, pentyl, hexyl, heptyl, octyl, nonyl, decyl, undecyl, dodecyl, tridecyl, tetradecyl, pentadecyl, cyclopentyl, cyclohexyl, cycloheptyl, and isomeric forms thereof.

In embodiments, the substituted hydrocarbon group may contain from 1 to about 25 carbon atoms, from 1 to about 15 carbon atoms, from 1 to about 15 carbon atoms, or from about 1 to about 13 carbon atoms, with one or more carbon atoms substituted with, for example, fluorine, bromine, chlorine, iodine, sulfur, amino, nitro, hydroxyl, cyano, alkoxy, or combinations thereof. The substituted portion of the substituted hydrocarbon groups may be, for example, a straight chain alkyl group, a branched alkyl group, a cycloalkyl group, an aryl group, an alkylaryl group, an arylalkyl group with a heteroatom, a straight chain alkenyl group, a branched alkenyl group. The substituted hydrocarbon groups may also a branched or straight chain alkyne. Example alkyl groups may include, for example, methyl, ethyl, propyl, butyl, pentyl, hexyl, heptyl, octyl, nonyl, decyl, undecyl, dodecyl, tridecyl, tetradecyl, pentadecyl, cyclopentyl, cyclohexyl, cycloheptyl, and isomeric forms thereof. In embodiments, the hydrocarbon group may be optionally substituted alkyl and optionally substituted aryl.

In one embodiment, R is hydrogen, a hydrocarbon having from 1 to about 13 carbon atoms, and x is 1 to 3.

Unless otherwise indicated, in identifying the substituents for R, the term "heteroatom" includes hydrogen, fluorine, bromine, chlorine, iodine, sulfur, nitrogen, oxygen, or combinations thereof. Further, the heteroatom can be a single atom such as, for example, chlorine or fluorine or the single atom contained in a compound such as, for example, the nitrogen atom (N) in an amino compound ($NH_2$) and the sulfur atom (S) in a $SO_2$ compound.

Polyhydroxyalkanoate (PHA) polymer compounds are natural polyester materials that may be manufactured inside the cells of bacteria grown in high densities. The PHA compounds may be present in an amount of 90% dry weight in the bacteria cells. Furthermore, the polyhydroxyalkanoate may be a fermentation product, particularly of a microbiological process, whereby a microorganism lays down polyhydroxyalkanoate during normal or manipulated growth. Manipulation may be achieved by removing or failing to provide one or more nutrients necessary for cell multiplication. The microorganisms may be wild type or mutated or may have the necessary genetic material introduced into it, for example by any of the methods of recombinant DNA technology. It is to be emphasized that it is not necessary for the polyhydroxyalkanoate-producing organism to be a microorganism, but at present such organisms are preferred.

The basic structure of PHAs consists mainly of repeating monomeric units of hydroxyalkanoates (HA). The hydroxyl group of one monomer is attached to the carboxyl group of another monomer by an ester bond to form a long chain type polyester accumulation. Examples of polyhydroxyalkanoate compounds include those described in U.S. Pat. Nos. 5,534, 616; 6,521,429, U.S. Patent Application Publication No. 2008/0299627, and WO 1995020614, each of which are incorporated herein by reference in their entirety. Co-polymers of PHAs comprise at least two randomly repeating monomer units (RRMU). For example, the general structure of a PHA co-polymer may be comprised of a first RRMU having the general structure

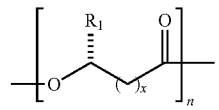

and a second RRMU having the general structure

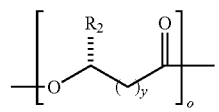

wherein $R_1$ and $R_2$ are independently selected from the group consisting of a hydrogen atom, a hydrocarbon group, a heteroatom, and combinations thereof, and wherein n and o independently represent the number of repeating units of from 1 to about 35,000, and wherein x and y independently represent an integer from 1 to about 5. Additional RRMUs, such as containing three, four, five, six, etc., RRMU's may also be included in the PHA such that they have the same or different number of repeating units.

PHAs are enormously versatile, and as many as 100 different PHA structures have been identified. PHA structures can vary in two ways. First, PHAs can vary according to the structure of the pendant groups, which are typically attached to a carbon atom having (D)-stereochemistry. The pendant groups form the side chain of hydroxyalkanoic acid not contributing to the PHA carbon backbone. Second, PHAs can vary according to the number and types of their repeat units. These variations in PHA structure can cause variations in their physical characteristics. These physical characteristics make PHAs useful for a number of products that may be commercially valuable.

For example, PHAs may be classified by this second method according to the type of alkyl group in the C3 or β position. For example, in the above Formula, if x is 1 and R is hydrogen, the PHA is poly(3-hydroxypropionate) ("P(3HP)"), if x is 1 and R is a methyl group, the PHA is poly(3-hydroxybutyrate) ("P(3HB)"), if x is 1 and R is an ethyl group, the PHA is poly(3-hydroxyvalerate) ("P(3HV)"), if x is 1 and R is a propyl group, the PHA is poly(3-hydroxycaproate) ("P(3HC)"), if x is 1 and R is a butyl group, the PHA is poly(3-hydroxyheptanoate) ("P(3HH)"), if x is 1 and R is a pentyl group, the PHA is poly(3-hydroxyoctanoate) ("P(3HO)"), if x is 1 and R is a hexyl group, the PHA is poly(3-hydroxynonanoate) ("P(3HN)"), if x is 1 and R is a heptyl group, the PHA is poly(3-hydroxydecanoate) ("P(3HD)"), if x is 1 and R is an octyl group, the PHA is poly(3-hydroxyundecanoate) ("P(3HUD)"), if x is 1 and R is a nonyl group, the PHA is poly(3-hydroxydodecanoate) ("P(3HDD)"). Further, in the above Formula, if x is 2 and R is a hydrogen atom, the PHA is poly(4-hydroxybutyrate) ("P(4HB)"), if x is 2 and R is a methyl group, the PHA is poly(4-hydroxyvalerate) ("P(4HV)"), if x is 3 and R is hydrogen, the PHA is poly(5-hydroxyvalerate) ("P(5HV)").

In embodiments, the polyhydroxyalkanoate compound is a homopolymer or co-polymer comprised of at least one moiety selected from the group consisting of 3-hydroxypropionate, 3-hydroxybutyrate, 3-hydroxyvalerate, 3-hydroxyhexanoate, 3-hydroxyheptanoate, 3-hydroxyoctanoate, 3-hydroxynonanoate, 3-hydroxydecanoate, 3-hydroxyundecanoate, 3-hydroxydodecanoate, and combinations thereof.

The polyhydroxyalkanoate compound may be comprised of from 1 to about 15 polyhydroxyalkanoate monomers. The polyhydroxyalkanoate compound may be present in a 5 copolymer, terpolymer, or a copolymer containing more than 3 chemically distinct monomers in any desired number of polyhydroxyalkanoate monomers. Examples of the poly(3-hydroxyalkanoate) copolymer include copolymers of 3-hydroxybutyrate and another hydroxyalkanoate having 3 to 12 carbon atoms. Examples of the additional polyhydroxyalkanoate compounds include (3-hydroxybutyrate)-(3-hydroxypropionate) copolymer, (3-hydroxybutyrate)-(3-hydroxypropionate)-(4-hydroxybutyrate) copolymer, (3-hydroxybutyrate)-(3-hydroxyvalerate) copolymer, (3-hydroxybutyrate)-3-hydroxyvalerate)-(3-hydroxyhexanoate)-(3-hydroxyheptanoate) copolymer, (3-hydroxybutyrate)-(3-hydroxyvalerate)-(3-hydroxyhexanoate)-(3-hydroxyheptanoate)-(3-hydroxyoctanoate) copolymer, (3-hydroxybutyrate)-(3-hydroxyhexanoate)-(3-hydroxyoctanoate) copolymer, (3-hydroxypropionate)-(3-hydroxyvalerate)-(3-hydroxyhexanoate)-(3-hydroxyheptanoate)-(3-hydroxyoctanoate)-(3-hydroxynonanoate)-(3-hydroxydecanoate) copolymer, (3-hydroxypropionate)-(3-hydroxybutyrate)-(3-hydroxyvalerate)-(3-hydroxyheptanoate)-(3-hydroxyoctanoate) copolymer, (3-hydroxybutyrate)-(3-hydroxyvalerate)-(3-hydroxyhexanoate)-(3-hydroxyheptanoate)-(3-hydroxyoctanoate)-(3-hydroxynonanoate)-(3-hydroxydecanoate)-(3-hydroxyundecanoate)-(3-hydroxydodecanoate) copolymer, (3-hydroxybutyrate)-(4-hydroxybutyrate) copolymer, and combinations thereof.

Additional examples of the poly(3-hydroxyalkanoate) copolymer include copolymers of 3-hydroxyheptoate and another hydroxyalkanoate having 3 to 12 carbon atoms. Examples include (3-hydroxyheptoate)-3-hydroxypropionate) copolymer, (3-hydroxyheptoate)-3-hydroxypropionate)-(4-hydroxybutyrate) copolymer, (3-hydroxyheptoate)-(3-hydroxyvalerate) copolymer, (3-hydroxyheptoate)-(3-hydroxyvalerate)-(3-hydroxyhexanoate) copolymer, (3-hydroxybutyrate)-(3-hydroxyvalerate)-(3-hydroxyhexanoate)-(3-hydroxy-heptanoate)-(3-hydroxyoctanoate) copolymer, (3-hydroxybutyrate)-(3-hydroxyhexanoate)-(3-hydroxyheptoate) copolymer, (3-hydroxypropionate)-(3-hydroxyvalerate)-(3-hydroxyhexanoate)-(3-hydroxyheptanoate)-(3-hydroxyoctanoate)-(3-hydroxynonanoate)-(3-hydroxydecanoate) copolymer, (3-hydroxyheptoate)-(3-hydroxyoctanoate) copolymer, (3-hydroxyheptoate)(3-hydroxynonanoate) copolymer, and (3-hydroxyheptanoate)-(3-hydroxydecanoate) copolymer, and combinations thereof.

Methods for producing PHA are described in U.S. Pat. No. 7,098,298 and U.S. Patent Application Publication Nos. 2005/0228168, 2006/0105440, and 2005/0239998, each of which is hereby incorporated by reference herein in its entirety. Specifically, one such method for producing PHA in a plant involving genetically manipulating the plant to produce in its peroxisomes at least two enzymes in the PHA biosynthetic pathway. The plants comprise in their genomes at least two stably incorporated DNA constructs, each DNA construct comprising a coding sequence for an enzyme involved in PHA synthesis operably linked to a promotor that drives the expression of a gene in a plant. Such plants are then genetically manipulated to produce a PHA synthase (also known as a PHA polymerase) that catalyzes polymer synthesis. The PHA synthase catalyzes the synthesis of copolymers, such as copolymers comprised of 3-hydroxybutanoic acid monomers and at least one additional monomer or copolymers comprised of 3-hydroxybutanoic acid monomers and at least one additional monomer having a hydroxyacyl-chain length of from 1 to about 25 carbon atoms, from about 2 to about 20 carbon atoms, or from about 5 to about 18 carbon atoms. Examples of PHA synthases include PHA synthases encoded by nucleotide sequences isolatable from *Pseudomonas oleovorans* (GenBank Accession No. M58445, SEQ ID NO: 8), *Pseudomonas putida* (GenBank Accession No. AF042276, SEQ ID NO: 9), *Pseudomonas aeruginosa* (EMBL Accession No. X66592, SEQ ID NO: 10), *Aeromonas caviae* (DDBJ Accession No. D88825, SEQ ID NO: 11), and *Thiocapsa pfennigii* (EMBL Accession No. A49465, SEQ ID NO: 12). The preferred PHA synthases additionally include the PHA synthases encoded by nucleotide sequences isolatable from *Pseudomonas fluorescens*.

The polyhydroxyalkanoate compound may be present in the phase change ink composition in any suitable or desired amount. In embodiments, the polyhydroxyalkanoate compound is present in the phase change ink composition in an amount of from about 0.5 to about 20 percent, or from about 1 to about 15 percent, or about 2 to about 10 percent, by weight, based on the total weight of the phase change ink composition. In embodiments, minimal amounts of the PHA material, such as from about 1 to about 3 percent by weight based on the total weight of the phase change ink composition are required to substantially improve scratch and fold offset properties of the present inks without compromising necessary properties such as fast crystallization kinetics and Newtonian rheological behavior. The projected cost for large volumes of bio-derived P(HHp-co-HN) material is about $10 to about $20 per kilogram making the present phase change ink compositions economically advantageous.

In embodiments, due to the polar nature of the polyhydroxyalkanoate compound in the ink vehicle, the inclusion of the polyhydroxyalkanoate compound in the ink vehicle is intended to (1) increase the robustness and enhance the cohesion of the phase change ink composition while in a solid state and (2) reduce the total number of total components and amount of petroleum components in the ink vehicle. This increased robustness is evident as the solid ink herein does not shatter but merely deforms upon being subjected to various stresses.

The phase ink compositions of the present disclosure can be prepared by any desired or suitable method. In embodiments, a method for preparing a phase change ink composition herein comprises combining a an amorphous compound;

a crystalline compound; an optional colorant; an optional synergist; an optional dispersant; and at least one polyhydroxyalkanoate compound, to produce a phase change ink composition.

For example, the ink ingredients can be mixed together, followed by heating, to a temperature of at least about 100° C. to no more than about 140° C., although the temperature can be outside of this range, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

In embodiments, an ink jet printer stick or pellet herein contains a phase change ink composition comprising an amorphous compound; a crystalline compound; an optional colorant; an optional synergist; an optional dispersant; and at least one polyhydroxyalkanoate compound.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

In embodiments, a method herein comprises incorporating into an ink jet printing apparatus a phase change ink composition as described herein; melting the ink composition; and causing droplets of the melted ink to be ejected in an imagewise pattern onto a substrate.

Any suitable substrate or recording sheet can be employed, including plain papers such as XEROX® 4024 papers, XEROX® Image Series papers, Courtland® 4024 DP® paper, ruled notebook paper, bond paper, silica coated papers such as Sharp Company silica coated paper, JuJo® paper, Hammermill® Laserprint Paper, and the like, transparency materials, fabrics, textile products, plastics, polymeric films, inorganic substrates such as metals and wood, and the like. In specific embodiments, the substrate comprises a coated paper.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Colored inks were prepared by adding an attrited pigment concentrate to an ink base comprising a crystalline component and an amorphous component as shown in Table 2.

TABLE 2

| Crystalline Component | Amorphous Component |
|---|---|
| (structure shown) | (structure shown) |

Comparative Example 1

Pigment Concentrate Procedure

In a beaker was added 156 grams Di-DL-menthyl L-tartrate (DMT), 20 grams Solsperse® 32000, and 4 grams pigment synergist SunFlo® SED-B124. The solution was stirred for 30 minutes at 130° C., and 20 grams of a cyan pigment, C.I. Pigment Blue 15:3, commercially available from Clariant, were added and stirred for an additional 1 hour at 130° C. This is referred to as the pigment wetting phase. This mixture was then transferred to a 01 attritor vessel, available from Union Process, containing 1800 grams of ⅛ inch stainless steel shots. The mixture was stirred attrited at 350 RPM for 24 hours at 130° C. The pigment concentrate was then sieved of shots. This mixture is referred to as Pigment Concentrate A.

Ink Preparation.

In a 50 milliliter beaker was added 2 grams Pigment Concentrate A, 7.6 grams of the crystalline component, and 0.35 grams DMT. The mixture was then stirred at 130° C. for 2 hours and poured into a pan to freeze (solidify).

Example 2

An ink was prepared in the same manner as in Comparative Example 1 except that PHA was present in the ink formulation such that the PHA was present in the ink at 1 pph.

Example 3

An ink was prepared in the same manner as in Comparative Example 1 except that PHA was present in the ink formulation such that the PHA was present in the ink at 3 pph. PHA was VersaMer™ PHN commercially obtained from Polyferm Canada, Inc. The PHA structure has a mixture of R=—CH$_2$CH$_2$—CH$_3$, R$_1$=—CH$_2$CH$_2$CH$_2$CH$_2$—CH$_3$ and R$_2$=—CH$_2$CH$_2$CH$_2$CH$_2$CH$_2$—CH$_3$ and X=1 of the formula

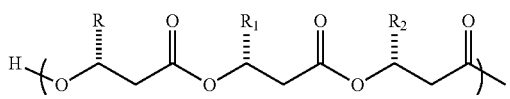

The numbers in Table 3 relate to the composition of the inks as parts per hundred (pph).

TABLE 3

| Component | Comparative Example 1 | Example 2 | Example 3 |
|---|---|---|---|
| Crystalline Component | 76.5 | 75.7 | 74.1 |
| DMT | 19.1 | 18.9 | 18.5 |
| P(HHp-co-HN) (PHA) | 0.0 | 1.0 | 3.0 |
| Cyan pigment | 2.0 | 2.0 | 2.0 |
| SunFlo ® SFD-B124 | 0.4 | 0.4 | 0.4 |
| Solsperse ® 32000 | 2.0 | 2.0 | 2.0 |

Sunflo® SFD-B124 is a derivatized sulfonated copper phthalocyanine, available from Sun Chemical.

Cyan pigment is a C.I. Pigment Blue 15:3 pigment available from Clariant Corporation.

Solsperse® 32000 is a dispersant available from Lubrizol Corporation.

The inks of Comparative Example 1, and Examples 2 and 3 were prepared by combining the crystalline and amorphous components in the amounts provided in Table 3, adding the PHA, the synergist Sunflo® SFD-B 124, a C.I. Pigment Blue 15:3 pigment available from Clariant Corporation and Solsperse 32000, stirring, and heating to 140° C. for 2 hours.

Comparative Example 4

Triamide wax as prepared in Example 2 of U.S. Pat. No. 6,860,930, which is hereby incorporated by reference herein in its entirety, was prepared as follows. To a 1,000 milliliter four-neck round bottom flask fitted with a Trubore stirrer, N$_2$ inlet, Dean-Stark trap with condenser and N$_2$ outlet and thermocouple-temperature controller was added 350.62 grams (0.3675 moles) of UNICID® 350 (a mono-acid obtained from Baker Petrolite Corporation) of the formula CH$_3$(CH$_2$)$_n$COOH, wherein n has an average value of about 37 and is believed to have a range of from about 34 to about 40, and 0.79 grams of NAUGARD® 524 (antioxidant available from Chemtura Corporation). The mixture was heated to 115° C. to melt and stirred at atmospheric pressure under N$_2$. 51.33 grams (0.1167 moles) of JEFFAMINE T0403 (mixture of triamines obtained from Huntsman Corporation) was then added to the reaction mixture and the reaction temperature was increased to 200° C. gradually over 0.5 hour and held at that temperature for another 3 hours. Some water was carried out by slow blowing N$_2$ and condensed into the trap when the mixture temperature reached about 180° C. The trap and condenser were then removed and vacuum (about 25 mm Hg) was applied for about 0.5 hour and then released. The liquid product was cooled down to about 150° C. and poured onto aluminum to solidify.

Urethane resin as prepared in Example 4 of U.S. Pat. No. 6,309,453, which is hereby incorporated by reference herein in its entirety, was prepared as follows. About 80.0 grams (0.052 moles) of ARCOL LHT 112 glycerol propoxylate available from ARCO Chemical Co. and about 46.6 grams (0.156 moles) octadecyl isocyanate (Mondur O-Octadecyl Isocyanate available from Bayer Corp.) were placed in a 200 milliliter beaker with a magnet and heated to 115° C. with a silicone oil bath. Five drops of catalyst (Fascat® 4202 dibutyltindilaurate available from Elf Atochem North America, Inc.) were added and the mixture allowed to react for 2 hours at 115° C. An FT-IR of the reaction product showed the absence (disappearance) of a peak at ~2285 cm$^{-1}$ (NCO) and the appearance (or increase in magnitude) of peaks at ~1740-1680 cm$^{-1}$ and ~1540-1530 cm$^{-1}$ corresponding to urethane frequencies. The final urethane product was then poured into a specimen jar and allowed to cool and harden. This final product was a solid at room temperature characterized by a viscosity of about 15.8 centipoise as measured by a Ferranti-Shirley cone-plate viscometer at about 135° C., and a melting point of about 23.8° C. as measured by a Differential Scanning calorimetry using a DuPont 2100 calorimeter at a scan rate of 20° C./minute.

Cyan dye as prepared in Example VII of U.S. Pat. No. 6,472,523, which is hereby incorporated by reference herein in its entirety, was prepared as follows. A mixture of 4-(3-pentadecyl)phenoxyphthalonitrile (25.8 grams, 0.060 mole), copper(II) acetate dehydrate (3.0 grams, 0.015 mole), and ammonium acetate (9.2 grams, 0.12 mole) in 100 milliliters of NMP was stirred and heated to 120° C. Slow gas evolution was observed, and after 5 minutes, a deep, dark blue color developed. After 30 minutes at 120° C., the reaction mixture was heated to 180° C. for 1 hour. NMP (50 milliliters) was then added and the mixture was stirred and reheated to 180° C., followed by cooling with stirring to room temperature. The product was then filtered and the solid was washed in the filter funnel with 2×100 milliliter portion of DMF. It was then stirred in 200 milliliters of acetone at 50° C. and subsequently filtered. This acetone treatment was repeated, and the solid was dried at 60° C. overnight to give the product as a coarse power (19.9 grams, 74 percent). The spectral strength of this material was 1.27×10$^5$ A*ml/g, which is indicative of high purity (i.e., about 98 percent purity).

An ink was prepared as follows. Into a 500 milliliter beaker were introduced 52.94 parts of a fractionated polymethylene wax available from The International Group, Inc., 14.82 parts triamide wax as prepared in Example 2 of U.S. Pat. No. 6,860,930, 14.25 parts KEMAMIDE® S-180 available from Chemtura Corporation, 13.42 parts KE-100 resin available from Arakawa Chemical Industries, Ltd., 0.91 parts urethane resin as prepared in Example 4 of U.S. Pat. No. 6,309,453, and 0.16 parts NAUGARD® 445 available from Chemtura Corporation. The beaker was placed in an oven at 120° C. until all materials were molten then transferred to a hot plate and allowed to stir for 1 hour at 120° C. To this were slowly added, 3.51 parts of a cyan dye as prepared in Example VII of U.S. Pat. No. 6,472,523, where the newly formed ink was allowed to stir for 2 hours at 120° C. The resultant ink was filtered through a 1 micron glass fiber filter available from Parker-Hannifin Corporation and then poured into molds to form ink sticks and allowed to cool to room temperature.

Rheology.

The rheologies of the inks were determined at 110° C. using a 50 millimeter cone and plate geometry on a RFS-III rheometer, available from Rheometrics Corporation, now TA Instruments. The shear viscosities were determined from a logarithm-based shear rate sweep from 1 to approximately 251.2 s$^{-1}$ at 110° C. An appropriate target viscosity of the ink is approximately 10 centipoise at 110° C. The complex viscosities of the inks were also determined using a 50 millimeter cone and plate geometry from a logarithm-based frequency sweep from 0.1 to approximately 15.8 Hz at 110° C. A temperature sweep was also performed such that the viscosities of the inks were determined at 5° C. step-down intervals from 140 to 100° C. at 1 Hz.

Figure 2:
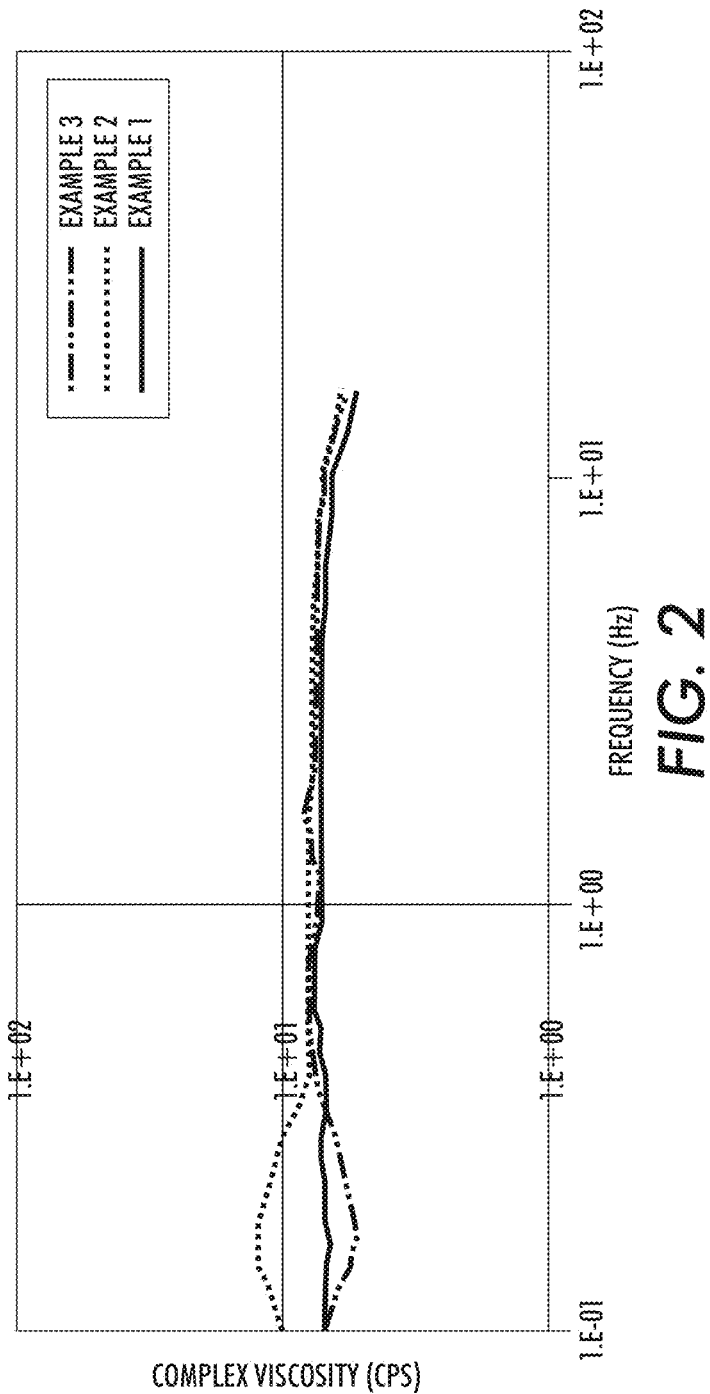
FIG. 2 is a graph showing complex viscosity (centipoise, y-axis) versus frequency (Hz, x-axis) for pigmented ink Examples 1, 2, and 3.

The pigmented ink Examples 2 and 3 exhibited Newtonian viscosity. FIG. 2 shows complex viscosity (centipoise, y-axis) versus frequency (Hz, x-axis) for the inks of Comparative Example 1 and Examples 2 and 3.

Figure 3:
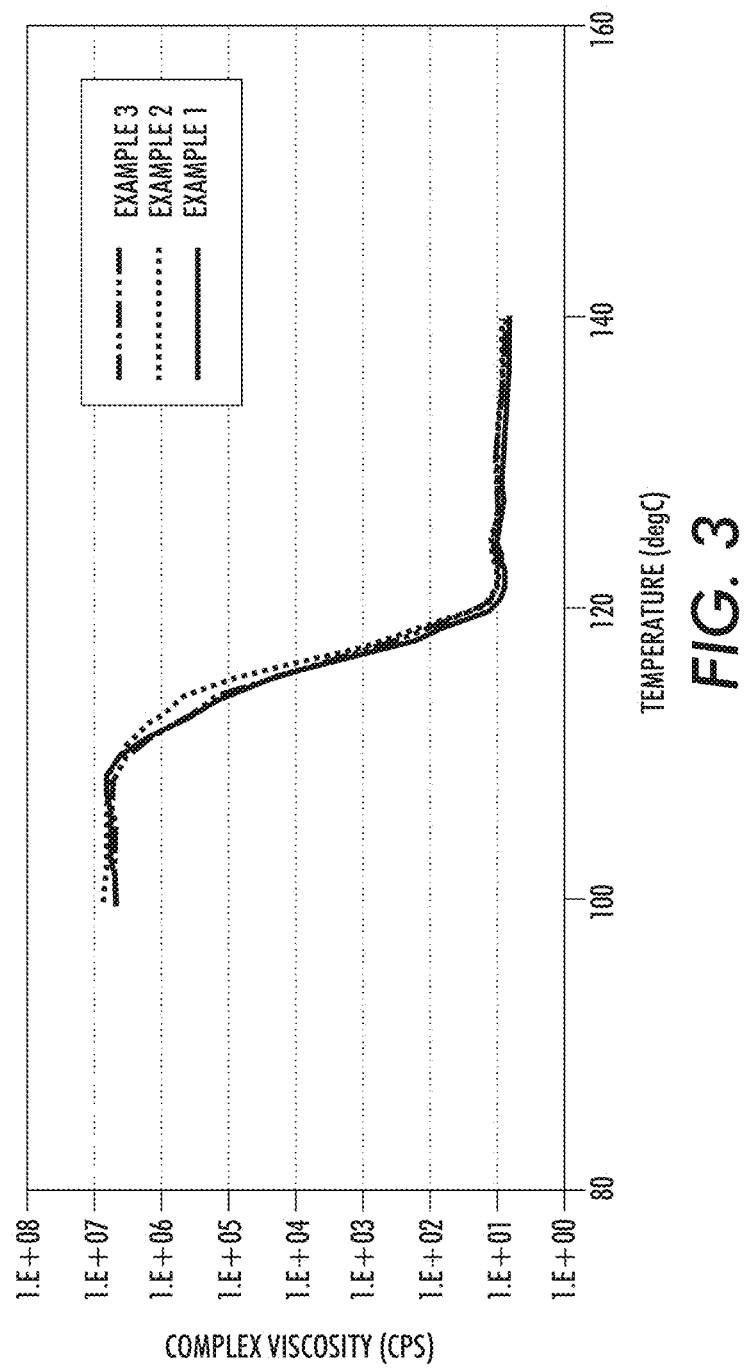
FIG. 3 is a graph showing complex viscosity (centipoise, y-axis) versus temperature (° C., x-axis) for pigmented ink Examples 1, 2, and 3.

FIG. 3 shows complex viscosity (centipoise, y-axis) versus temperature (° C., x-axis) for the inks of Comparative Example 1 and Examples 2 and 3 wherein the results indicated that the inks exhibited a jettable viscosity (i.e., ≤12 cps) at 140° C.

Ink Print Proofing and Robustness Testing.

K-proof prints were made on a K printing proofer, Model #30-05, available from Testing Machines, Inc. K-proof samples were made on coated paper (DCEG: Xerox® Digital Color Elite Gloss, 120 gsm). K-proof samples of Example 2 and Example 3 inks of the present disclosure incorporating 1 and 3 percent by weight of PHA, respectively. K-proof samples of Comparative Example 1 and Comparative Example 4 inks were prepared in the same manner. These K-proofs were spread by feeding each k-proof through a Xerox® Phaser® 8400 or Phaser® 8860 printer at 1 inch per second at a drum and paper pre-heat temperature of 50° C. with the ink-surface facing the transfix drum. One K-proof of each ink was then scratched using a three-finger gouge system, and another K-proof folded along with a Xerox® Business 4200 (75 gsm) facing page in a Duplo D-590 folder and evaluated for fold crease and fold offset. A third K-proof was spread at increasing spreader drum and pre-heat temperatures until offset of the ink from the K-proof became apparent. The degree of spread offset can be a limiting factor for certain print-process steps performed wherein relatively higher temperatures, such as about 70° C. or higher are preferred. A scratch/gouge finger has a curved tip at an angle of about 15° from vertical, with a weight of 528 grams applied, and is drawn across the image at a rate of approximately 13 millimeters/second. The scratch/gouge tip is similar to a lathe round nose cutting bit with a radius of curvature of approximately 12 millimeters.

Figure 4:
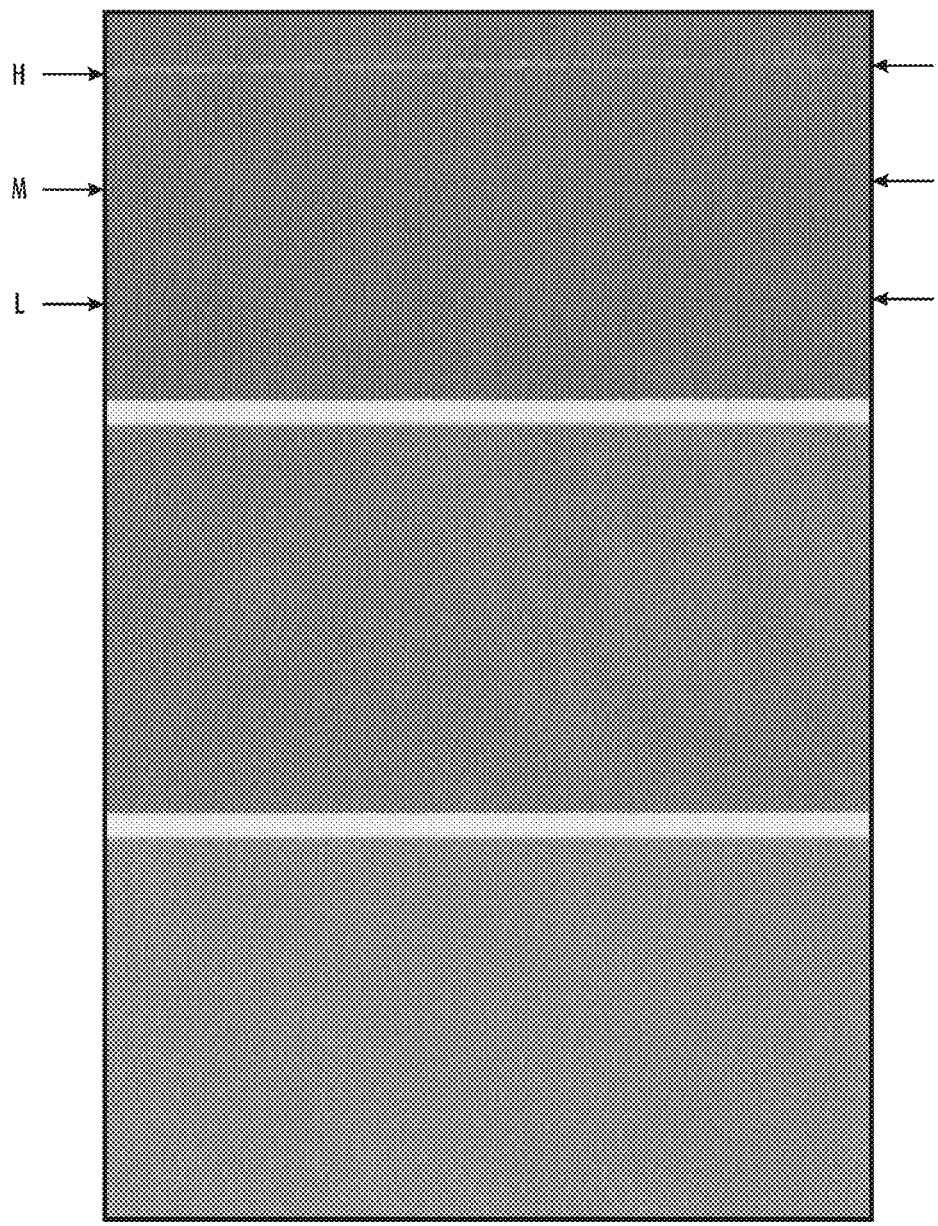
FIG. 4 is a scanned image of a K-proof sample of Example 1 scratched using a three-finger gouge tester.
Figure 5:
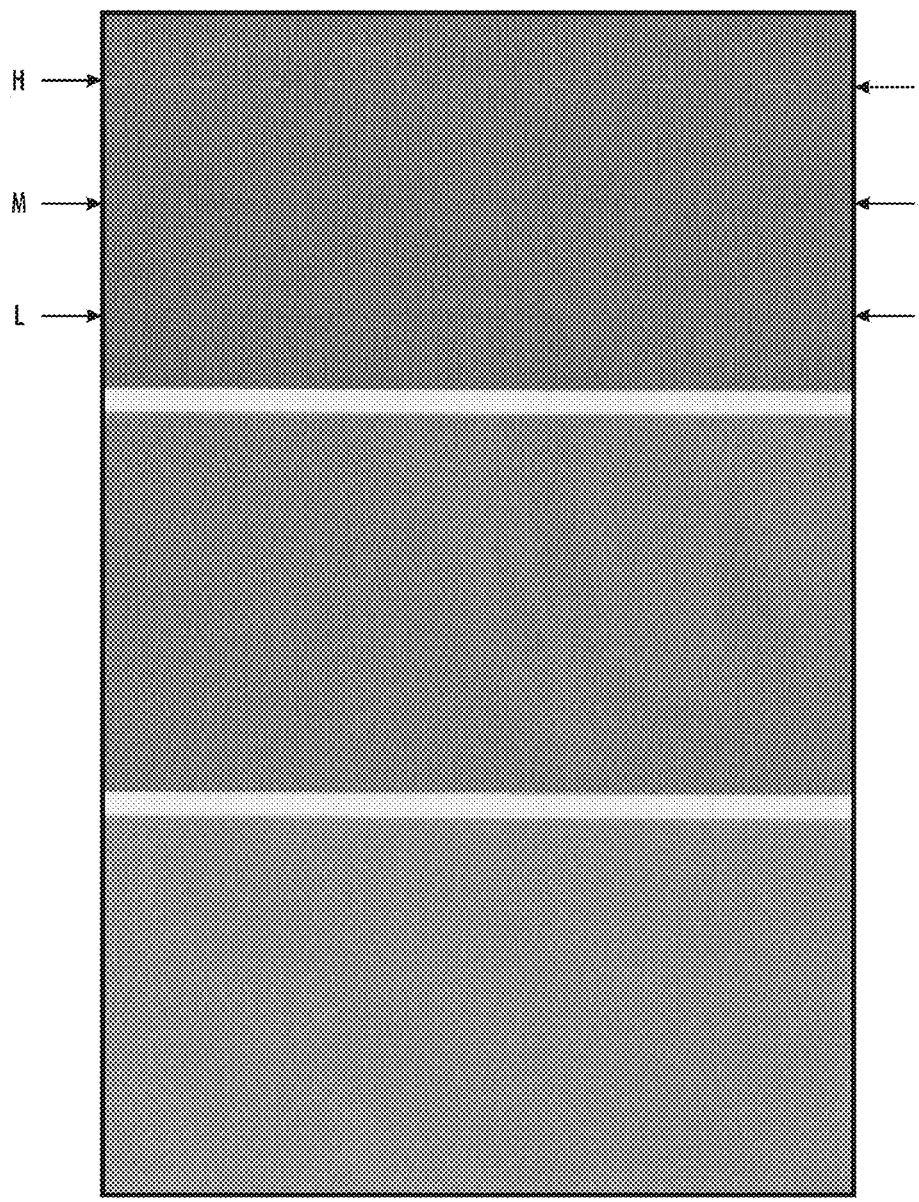
FIG. 5 is a scanned image of a K-proof sample of Example 2 scratched using a three-finger gouge tester.
Figure 6:
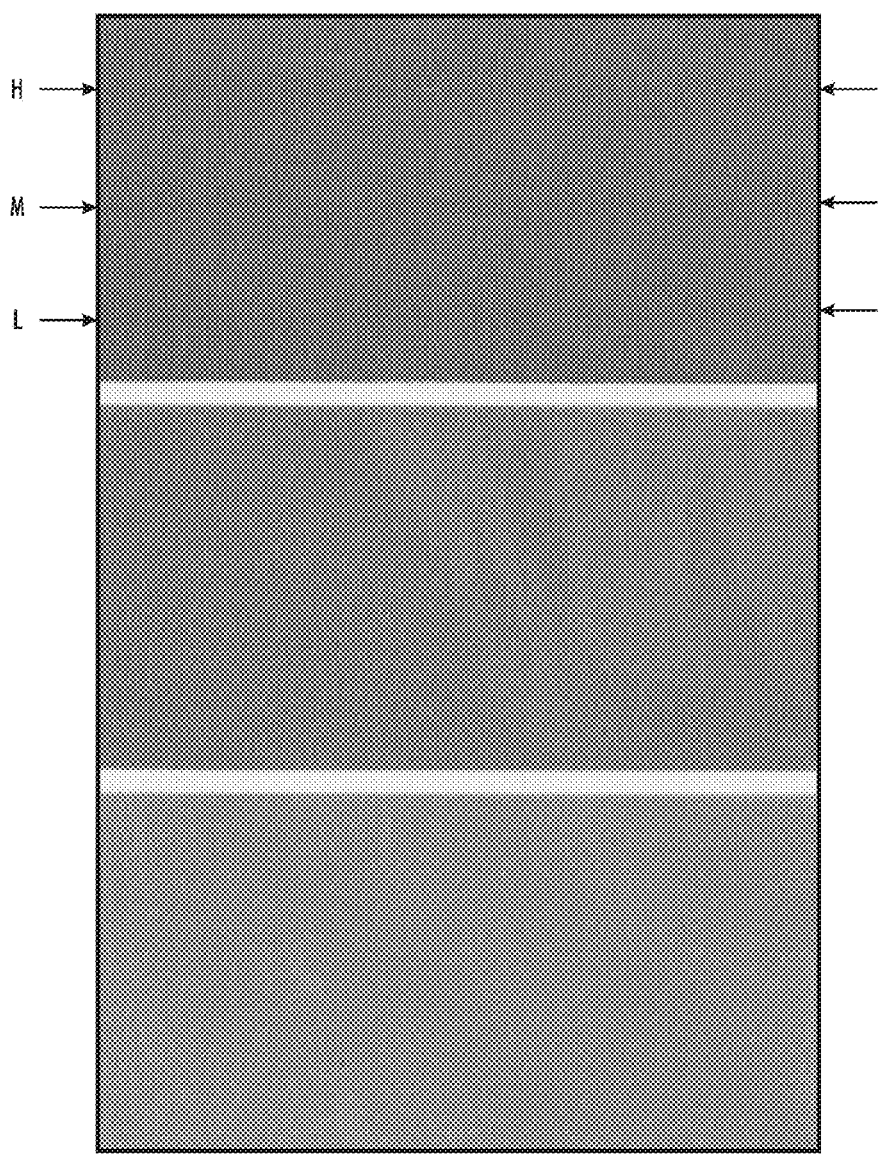
FIG. 6 is a scanned image of a K-proof sample of Example 3 scratched using a three-finger gouge tester.

Two K-proofs of each ink spread at 50° C. were visually assessed at room temperature for scratch, fold crease area, and fold offset. FIGS. 4, 5, and 6 show scanned images of K-proof samples scratched using the three-finger gouge tester. FIG. 4 shows a K-proof sample made with Comparative Example 1 pigmented ink. FIG. 5 shows a K-proof sample made with the pigmented ink of Example 2 of the present disclosure having 1 weight percent PHA. FIG. 6 shows a K-proof sample made with the pigmented ink of Example 3 of the present disclosure having 3 weight percent PHA. Table 4 provides a summary of robustness evaluation for these K-proofs.

The K-proofs were visually assessed for various robustness metrics including Fold offset, Fold crease, scratch and spread offset. Where a Rank Order was used, the K-proofs were visually compared side-by-side and ranked from best to worst within the set.

TABLE 4

| Example | PHA content (wt %) | Fold Offset, SIR Grade | Fold Crease Rank Order | Scratch Rank Order | Spread Offset (° C.) |
|---|---|---|---|---|---|
| Comparative 1 | 0 | 2.25 | 3 | 3 | >70 |
| 2 | 1 | 1.75 | 2 | 2 | >70 |
| 3 | 3 | 1.5 | 1 | 1 | >70 |
| Comparative 4 | 0 | 3 | 4 | 4 | 65 70 |

The results of Table 4 clearly indicate the Example 3 ink had substantial improvements in fold offset, fold crease and scratch compared to Comparative Examples 1 and 4. The addition of the PHA additive described herein provides improvements in the robustness performance of pigmented inks. Scratch resistance, fold crease resistance, and susceptibility to fold offset are all improved with increased PHA additive content in the total ink formulation.

Figure 7:
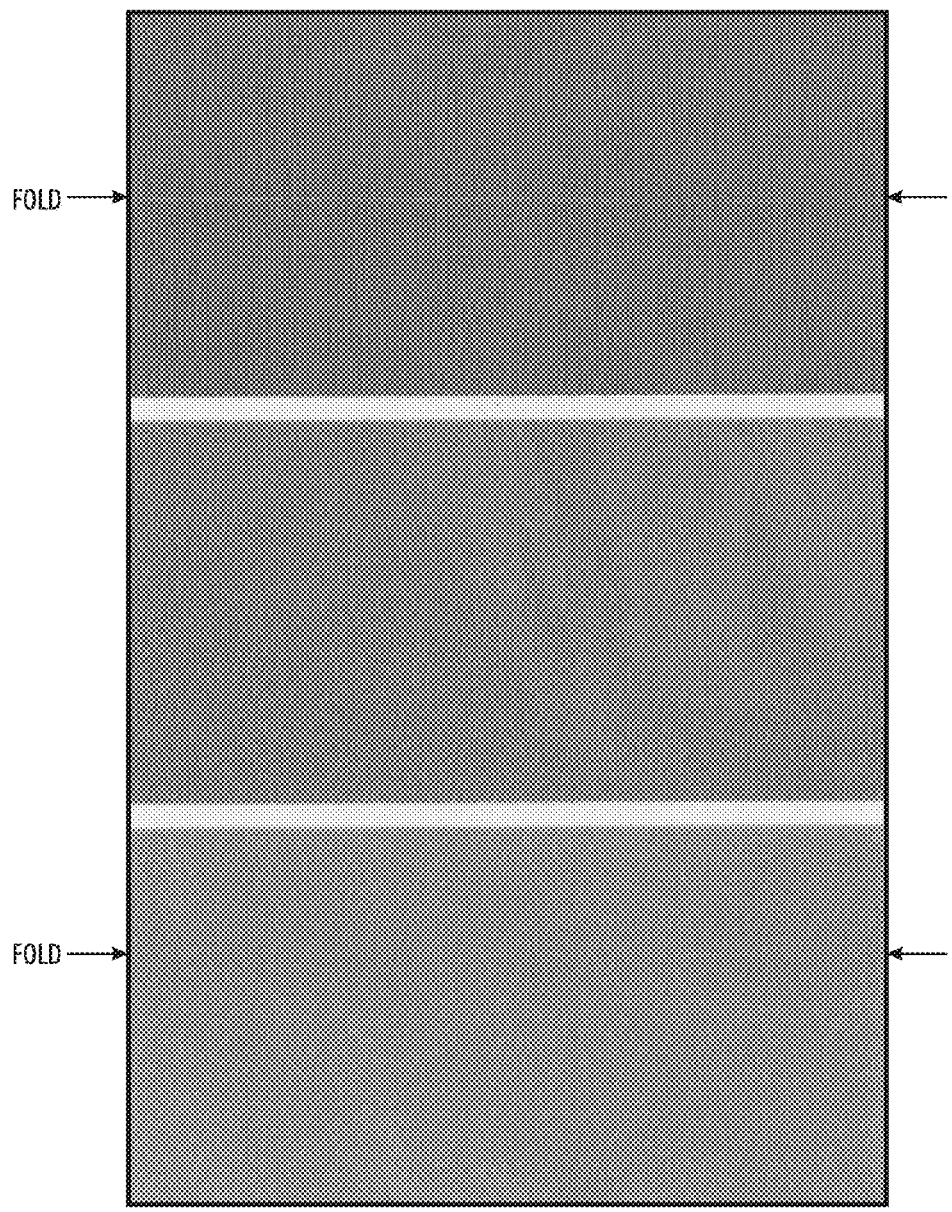
FIG. 7 is a scanned image of a K-proof sample of Example 1 folded using a Duplo® D590 folder.
Figure 8:
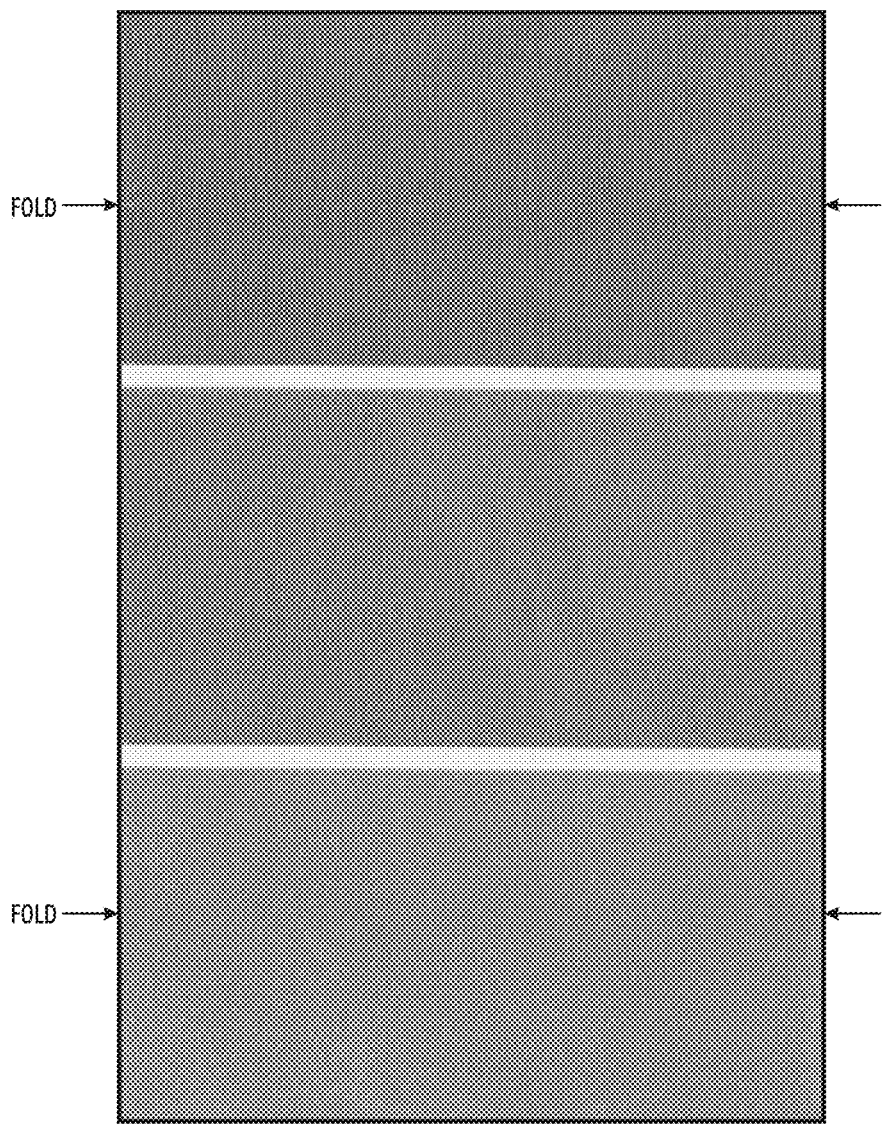
FIG. 8 is a scanned image of a K-proof sample of Example 2 folded using a Duplo® D590 folder.
Figure 9:
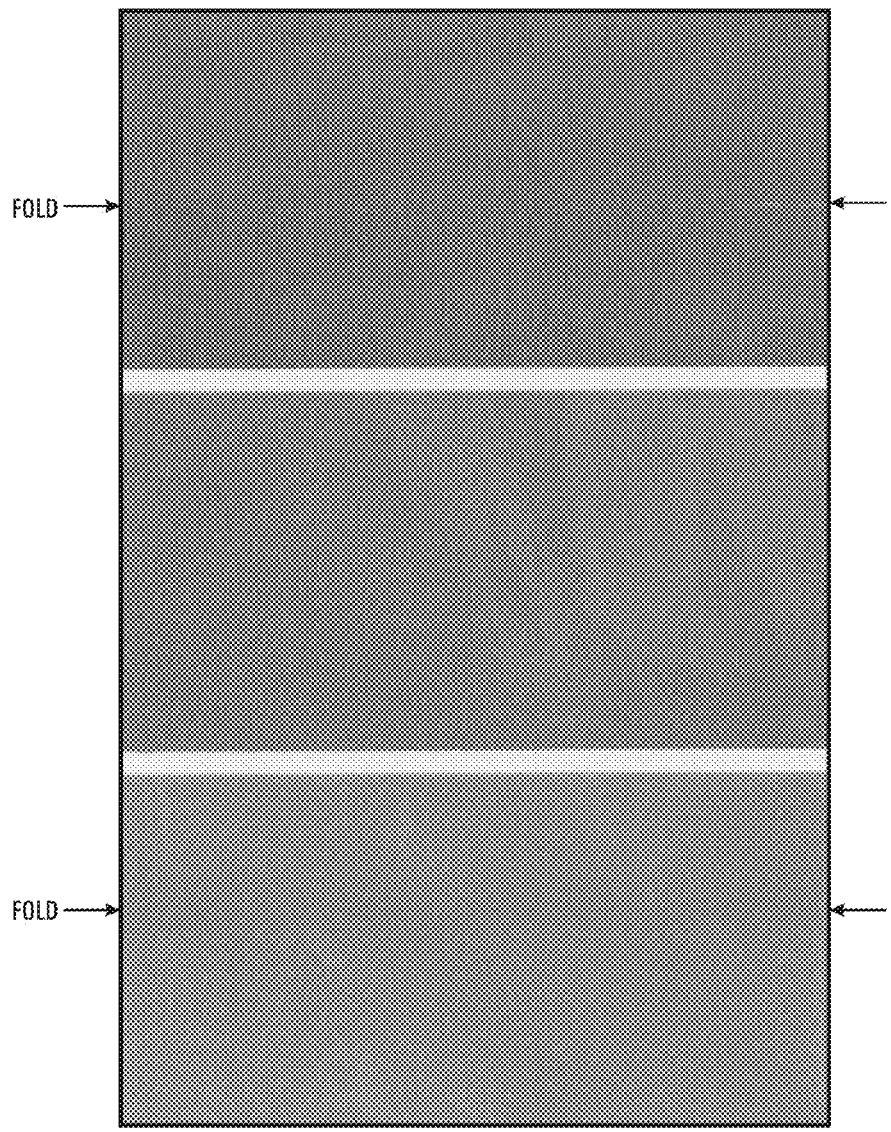
FIG. 9 is a scanned image of a K-proof sample of Example 3 folded using a Duplo® D590 folder.

FIGS. 7, 8, and 9 show scanned images of K-proof samples folded using a Duplo® D590 folder with a facing page. FIG. 7 shows a folded sample of the ink of Comparative Example 1. FIG. 8 shows a folded sample of the ink of Example 2. FIG. 9 shows a folded sample of the ink of Example 3. Dashes and labels indicate position of fold crease.

Figure 10:
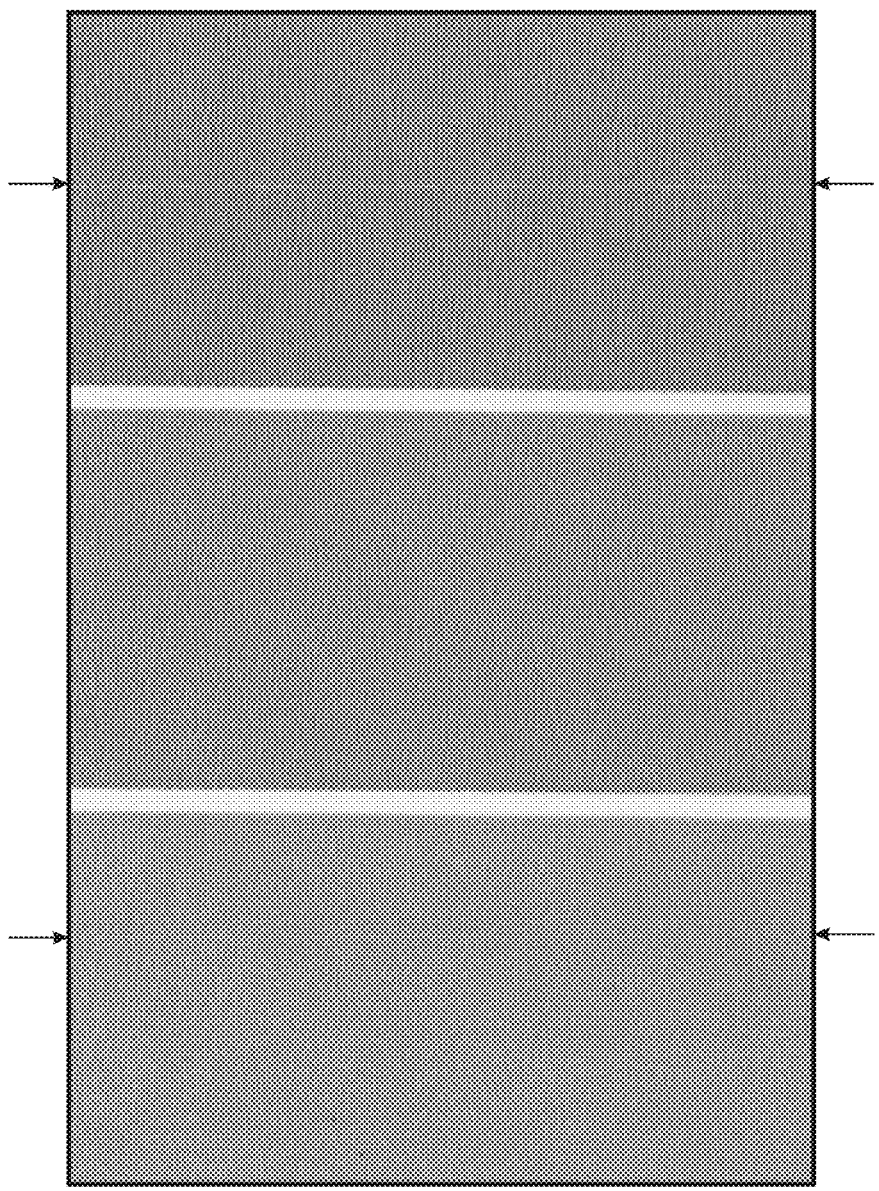
FIG. 10 is a scanned image of a K-proof sample of a comparative ink folded using a Duplo® D590 folder.
Figure 11:
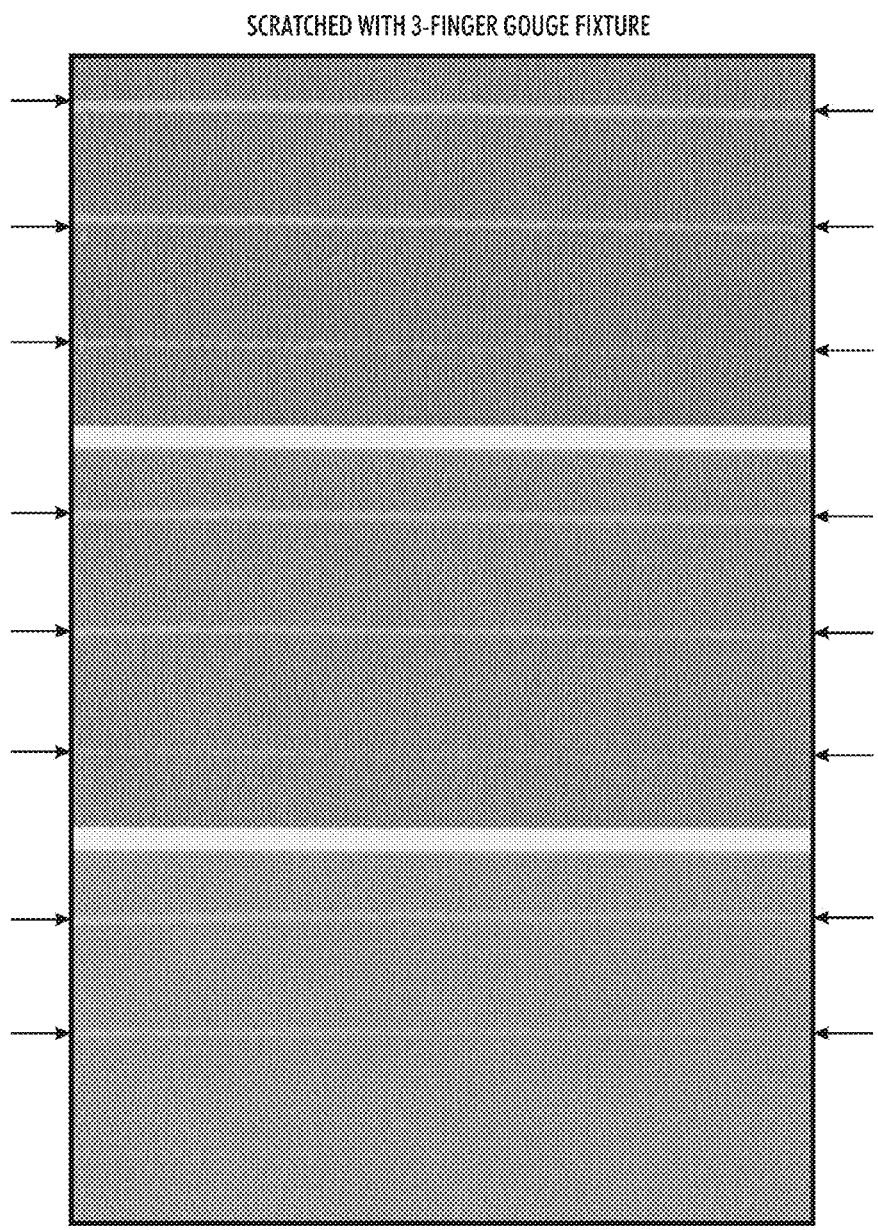
FIG. 11 is a scanned image of a K-proof sample of a comparative ink scratched using a three-finger gouge tester.

Scanned images of K-proof samples of the ink of Comparative Example 4 have been folded using a Duplo® D590 folder with a facing page, shown in FIG. 10. Arrows indicate location of fold creases. Scanned images of K-proof samples of the ink of Comparative Example 4 have been scratched using the three-finger gouge tester, shown in FIG. 11. Dashes indicate location of heavy, medium, and light scratches within each solid field, from top to bottom.

It will be appreciated that various embodiments of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink comprising:
   an amorphous compound, wherein the amorphous compound comprises a first ester of tartaric acid of the formula

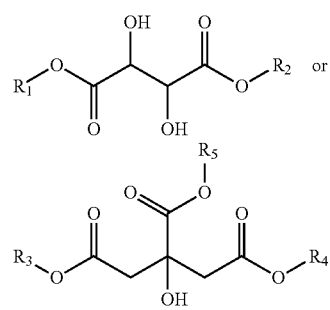

wherein each of $R_1$, $R_2$, $R_3$, $R_4$, and $R_5$ is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group;

a crystalline compound, wherein the crystalline compound comprises a second ester of tartaric acid of the formula

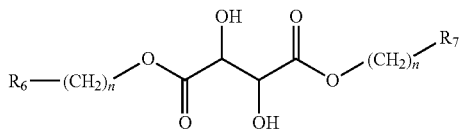

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3;
an optional colorant;
an optional synergist;
an optional dispersant; and
at least one polyhydroxyalkanoate compound of the formula

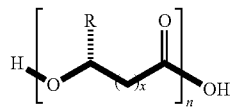

wherein R is independently selected from the group consisting of a hydrogen atom, a hydrocarbon group, a heteroatom, and combinations thereof;
wherein n represents the number of repeating units of from 1 to about 35,000; and
wherein x represents an integer from 1 to about 5.

2. The phase change ink of claim 1, wherein the crystalline compound is selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis-4-methylphenyl) L-tartrate, bis(4-methoxylphenyl) L-tartrate, bis(4-methylbenzyl) L-tartrate, bis(4-methoxybenzyl) L-tartrate, and stereoisomers and mixtures thereof.

3. The phase change ink of claim 1, wherein the amorphous compound is selected from the group consisting of bis(2-isopropyl-5-methylcyclohexyl) L-tartrate, (4-t-butylcyclohexyl)(cyclohexyl)-L-tartrate, stereoisomers and mixtures thereof.

4. The phase change ink of claim 1, wherein the amorphous compound is a compound of the formula

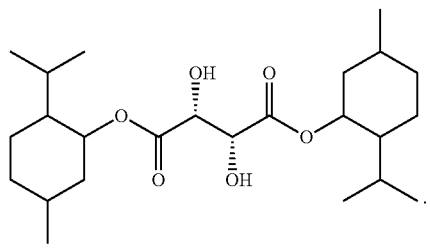 [SMILES: CC1CCC(C(C)C)C(OC(=O)[C@H](O)[C@@H](O)C(=O)OC2CC(C)CCC2C(C)C)C1]

5. The phase change ink of claim 1, wherein the crystalline compound is a compound of the formula

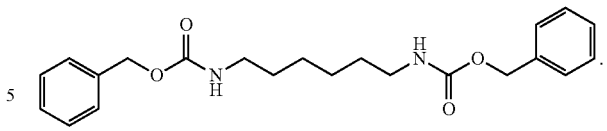

6. The phase change ink of claim 1, wherein the colorant is a pigment, a dye, or a mixture or combination thereof.

7. The phase change ink of claim 1, wherein the colorant is a pigment.

8. The phase change ink of claim 1, wherein the synergist is a compound of the formula

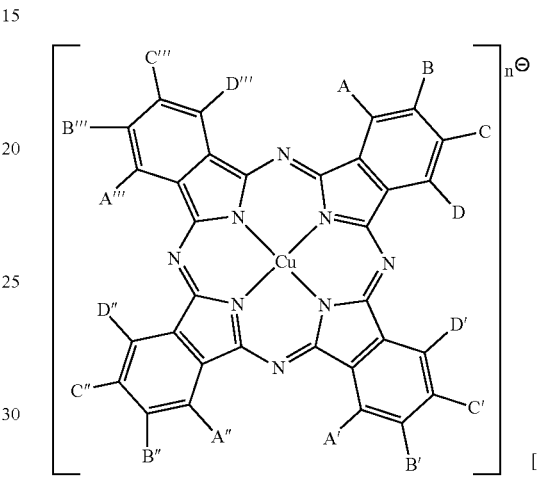

wherein A, B, C, and D, A', B', C', and D', A'', B'', C'', and D'', A''', B''', C''', and D''', are each independently selected from the group consisting of hydrogen, $SO_3H$, and $SO_3^-$, and wherein the synergist comprises a mixture of compounds wherein n is a mixture of from 0, 1, 2, 3, 4, or greater, or wherein n is a mixture of 0, 1, and 2, and wherein R is selected from hydrogen or an alkyl group having from about 1 to about 50 carbon atoms.

9. The phase change ink of claim 1, wherein the dispersant a compound of the formula

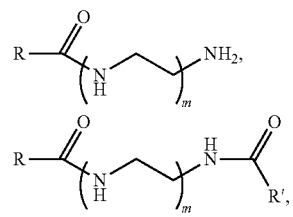

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

10. The phase change ink of claim 1, wherein the R in the at least one polyhydroxyalkanoate compound is a homopolymers or co-polymer comprising at least one moiety selected from the group consisting of 3-hydroxypropionate, 3-hydroxybutyrate, 3-hydroxyvalerate, 3-hydroxyhexanoate, 3-hydroxyheptanoate, 3-hydroxyoctanoate, 3-hydroxynonanoate, 3-hydroxydecanoate, 3-hydroxyundecanoate, 3-hydroxydodecanoate, and wherein the number of repeating units in the at least one moiety can be the same or different.

11. The phase change ink of claim 1, wherein the at least one polyhydroxyalkanoate compound is at least one (3-hydroxyheptanoate)-3-hydroxynonanoate) copolymer; or
   wherein the at least one polyhydroxyalkanoate compound is at least one poly(3-hydroxyheptanoic acid co-3-hydroxynonanoic acid).

12. A method for preparing a phase change ink composition comprising:
   combining an amorphous compound, wherein the amorphous compound comprises a first ester of tartaric acid of the formula

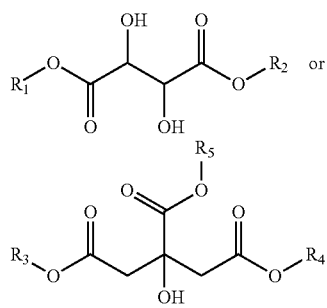

wherein each of $R_1$, $R_2$, $R_3$, $R_4$, and $R_5$ is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group; a crystalline compound, wherein the crystalline compound comprises a second ester of tartaric acid of the formula

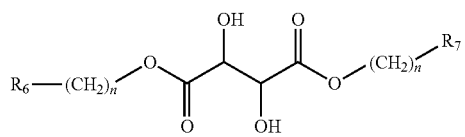

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3; an optional colorant; an optional synergist; an optional dispersant; and at least one polyhydroxyalkanoate compound of the formula

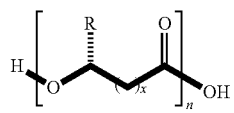

wherein R is independently selected from the group consisting of a hydrogen atom, a hydrocarbon group, a heteroatom, and combinations thereof; wherein n represents the number of repeating units of from 1 to about 35,000; and wherein x represents an integer from 1 to about 5, to produce a phase change ink composition.

13. The method of claim 12, wherein the amorphous compound is a compound of the formula

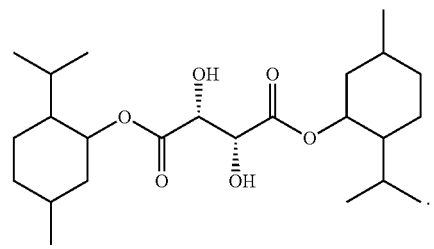 [SMILES: CC1CCC(C(C)C)C(OC(=O)[C@H](O)[C@@H](O)C(=O)OC2CC(C)CCC2C(C)C)C1]

14. The method of claim 12, wherein the crystalline compound is a compound of the formula

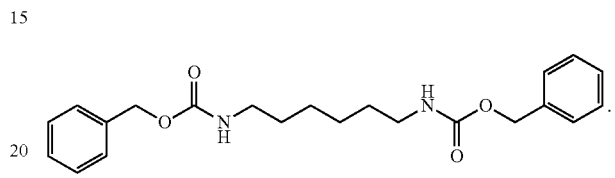

15. The method of claim 12, wherein the at least one polyhydroxyalkanoate compound is at least one (3-hydroxyheptanoate)-3-hydroxynonanoate) copolymer; or
   wherein the at least one polyhydroxyalkanoate compound is at least one poly(3-hydroxyheptanoic acid co-3-hydroxynonanoic acid).

16. An ink jet printer stick or pellet containing a phase change ink composition comprising an amorphous compound, wherein the amorphous compound comprises a first ester of tartaric acid of the formula

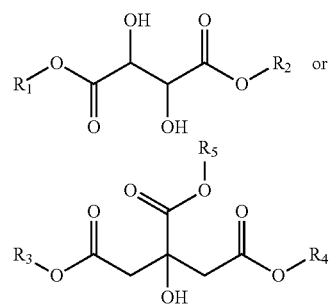

wherein each of $R_1$, $R_2$, $R_3$, $R_4$, and $R_5$ is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group; a crystalline compound wherein the crystalline compound comprises a second ester of tartaric acid of the formula

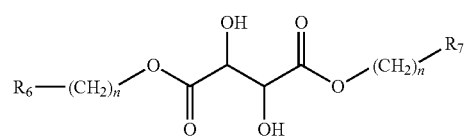

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3; an optional colorant; an optional synergist; an optional dispersant; and at least one polyhydroxyalkanoate compound of the formula

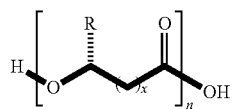

wherein R is independently selected from the group consisting of a hydrogen atom, a hydrocarbon group, a heteroatom, and combinations thereof; wherein n represents the number of repeating units of from 1 to about 35,000; and wherein x represents an integer from 1 to about 5, to produce a phase change ink composition.

17. The ink jet printer stick or pellet of claim 16, wherein the at least one polyhydroxyalkanoate compound is at least one (3-hydroxyheptanoate)-3-hydroxynonanoate) copolymer; or
    wherein the at least one polyhydroxyalkanoate compound is at least one poly(3-hydroxyheptanoic acid co-3-hydroxynonanoic acid).

* * * * *